US011282004B1

(12) United States Patent
Konerding et al.

(10) Patent No.: US 11,282,004 B1
(45) Date of Patent: Mar. 22, 2022

(54) OPPORTUNISTIC JOB PROCESSING OF INPUT DATA DIVIDED INTO PARTITIONS AND DISTRIBUTED AMONGST TASK LEVEL MANAGERS VIA A PEER-TO-PEER MECHANISM SUPPLIED BY A CLUSTER CACHE

(71) Applicant: Google LLC, Mountain View, CA (US)

(72) Inventors: David Konerding, San Mateo, CA (US); Jordan M. Breckenridge, Menlo Park, CA (US); Daniel Belov, London (GB)

(73) Assignee: Google LLC, Mountain View, CA (US)

( * ) Notice: Subject to any disclaimer, the term of this patent is extended or adjusted under 35 U.S.C. 154(b) by 136 days.

(21) Appl. No.: 16/229,886

(22) Filed: Dec. 21, 2018

Related U.S. Application Data

(63) Continuation of application No. 15/362,177, filed on Nov. 28, 2016, now Pat. No. 10,169,728, which is a
(Continued)

(51) Int. Cl.
*G06Q 10/06* (2012.01)
*G06F 9/54* (2006.01)
(Continued)

(52) U.S. Cl.
CPC ....... *G06Q 10/06311* (2013.01); *G06F 9/452* (2018.02); *G06F 9/468* (2013.01); *G06F 9/485* (2013.01); *G06F 9/4843* (2013.01); *G06F 9/5072* (2013.01); *G06F 9/541* (2013.01); *G06Q 10/06315* (2013.01)

(58) Field of Classification Search
None
See application file for complete search history.

(56) References Cited

U.S. PATENT DOCUMENTS 5,349,682 A * 9/1994 Rosenberry ........... G06F 9/3001
712/31
5,963,965 A 10/1999 Vogel
(Continued)

OTHER PUBLICATIONS 2.10 DAGMan Applications downloaded from the internet on Mar. 28, 2011. http://www.cs.wisc.edu/condor/manual/v7.0/2_10_DAGMan_Applications.html, 18 pages.
(Continued)

*Primary Examiner* — Michael W Ayers
(74) *Attorney, Agent, or Firm* — Lerner, David, Littenberg, Krumholz & Mentlik, LLP

(57) ABSTRACT

A global-level manager access a work order from a client and parameters associated with the work order. A service level agreement to meet the work order parameters is determined. The service level agreement includes a price. An indication is received from the client that the service level agreement is accepted. The one or more input files are partitioned into multiple shards, and the work order into multiple jobs. The jobs are distributed among a plurality of clusters to be processed using underutilized computing resources in the clusters. The job outputs are combined to form the work order output. The jobs are monitored to insure that the deadline for completion of the work order will be met.

20 Claims, 12 Drawing Sheets

Related U.S. Application Data continuation of application No. 13/432,117, filed on Mar. 28, 2012, now Pat. No. 9,535,765.

(60) Provisional application No. 61/468,417, filed on Mar. 28, 2011.

(51) Int. Cl.
*G06F 9/46* (2006.01)
*G06F 9/451* (2018.01)
*G06F 9/48* (2006.01)
*G06F 9/50* (2006.01)

(56) References Cited

U.S. PATENT DOCUMENTS

| | | | | |
|---|---|---|---|---|
| 6,108,683 | A * | 8/2000 | Kamada | G06F 9/4881 718/102 |
| 6,178,519 | B1 * | 1/2001 | Tucker | G06F 16/289 714/4.4 |
| 6,408,342 | B1 | 6/2002 | Moore et al. | |
| 6,779,016 | B1 * | 8/2004 | Aziz | G06F 9/5072 709/201 |
| 7,900,206 | B1 | 3/2011 | Joshi et al. | |
| 8,280,955 | B1 | 10/2012 | Tyagi | |
| 8,392,482 | B1 | 3/2013 | McAllister et al. | |
| 8,424,082 | B2 | 4/2013 | Chen et al. | |
| 2002/0065943 | A1 | 5/2002 | Czajkowski et al. | |
| 2002/0194184 | A1 | 12/2002 | Baskins et al. | |
| 2004/0205759 | A1 | 10/2004 | Oka | |
| 2006/0048157 | A1 * | 3/2006 | Dawson | G06F 9/5072 718/104 |
| 2006/0167966 | A1 * | 7/2006 | Kumar | G06F 9/5038 709/201 |
| 2006/0230405 | A1 | 10/2006 | Fraenkel et al. | |
| 2007/0050393 | A1 | 3/2007 | Vogel et al. | |
| 2007/0180451 | A1 | 8/2007 | Ryan et al. | |
| 2007/0294319 | A1 | 12/2007 | Mankad et al. | |
| 2007/0294697 | A1 * | 12/2007 | Theimer | G06F 9/5027 718/102 |
| 2008/0007765 | A1 | 1/2008 | Ogata et al. | |
| 2008/0115143 | A1 * | 5/2008 | Shimizu | G06F 9/5066 718/105 |
| 2008/0155103 | A1 | 6/2008 | Bailey | |
| 2008/0295112 | A1 | 11/2008 | Muscarella | |
| 2008/0306761 | A1 | 12/2008 | George et al. | |
| 2009/0055469 | A1 | 2/2009 | Burckart et al. | |
| 2009/0282477 | A1 | 11/2009 | Chen et al. | |
| 2010/0017461 | A1 | 1/2010 | Kokkevis | |
| 2010/0030800 | A1 | 2/2010 | Brodfuehrer et al. | |
| 2010/0115097 | A1 * | 5/2010 | Gnanasambandam | G06F 9/5027 709/226 |
| 2010/0125847 | A1 | 5/2010 | Hayashi | |
| 2010/0186018 | A1 * | 7/2010 | Bell, Jr | G06F 9/4856 718/104 |
| 2010/0269120 | A1 | 10/2010 | Manttari et al. | |
| 2011/0191781 | A1 | 8/2011 | Karanam et al. | |
| 2011/0302583 | A1 | 12/2011 | Abadi et al. | |
| 2012/0084798 | A1 | 4/2012 | Reeves | |
| 2012/0136835 | A1 | 5/2012 | Kosuru et al. | |
| 2013/0138768 | A1 | 5/2013 | Huang | |
| 2013/0139162 | A1 | 5/2013 | Jackson | |
| 2013/0151707 | A1 * | 6/2013 | Boutin | G06F 9/5077 709/226 |
| 2013/0174174 | A1 * | 7/2013 | Jung | G06F 9/5083 718/104 |
| 2013/0212165 | A1 | 8/2013 | Vermeulen et al. | |
| 2013/0325997 | A1 | 12/2013 | Higgins et al. | |
| 2013/0332612 | A1 | 12/2013 | Cai et al. | |
| 2014/0013301 | A1 | 1/2014 | Duggal et al. | |
| 2014/0025774 | A1 | 1/2014 | Gosain et al. | |

OTHER PUBLICATIONS

Amazon Elastic Compute Cloud (Amazon EC2) downloaded from the internet on Mar. 28, 2011. http://aws.amazon.com/ec2/, 11 pages.

Amazon Elastic Compute Cloud API Reference API Version Feb. 28, 2011 by Amazon Web Services, downloaded from the internet on Mar. 28, 2011, http://awsdocs.s3.amazonaws.com/EC2/2011-02-28/ec2-api-2011-02-28.pdf, 414 pages.

Amazon Elastic Compute Cloud Command Line Tools Reference API Version Feb. 28, 2011 by Amazon Web Services, downloaded from the internet on Mar. 28, 2011, http://awsdocs.s3.amazonaws.com/EC2/2011-02-28/ec2-clt-2011-02-28.pdf, 326 pages.

Amazon Elastic Compute Cloud Getting Started Guide API Version Feb. 28, 2011 by Amazon Web Services, downloaded from the internet on Mar. 28, 2011, http://awsdocs.s3.amazonaws.com/EC2/2011-02-28/ec2-gsg-2011-02-28.pdf, 32 pages.

Amazon Elastic Compute Cloud User Guide API Version Feb. 28, 2011 by Amazon Web Services, downloaded from the internet on Mar. 28, 2011, http://awsdocs.s3.amazonaws.com/EC2/2011-02-28/ec2-ug-2011-02-28.pdf, 373 pages.

Cluster Resources Moab Workload Manager, downloaded from the internet on Mar. 28, 2011. http://www.clusterresources.com/products/moab-cluster-suite/workload-manager.php, 2 pages.

Directed Acyclic Graph Manager, Condor Hihg Throughput Computing, DAGMan, downloaded from the internet on Mar. 28, 2011. http://www.cs.wisc.edu/condor/dagman/, 1 page.

GRAM—Globus downloaded from the internet on Mar. 28, 2011. http://dev.globus.org/wiki/GRAM, 3 pages.

GRAM4 Approach Execution Management: Key Concepts, downloaded from the internet on Mar. 28, 2011, http://www.globus.org/toolkit/docs/4.2/4.2.1/execution/key/, 24 pages.

Madrid, Marcella, "How to Get Started Using Your TeraGrid Allocation", PCS, Feb. 2011, downloaded from the internet on Mar. 28, 2011, http://www.teragridforum.org/mediawiki/images/1/15/NewUserTraining_TG10.pdf, 68 pages.

Moab Workload Manager Administrator's Guide, Version 6.0.1, Adaptive Computing, downloaded on Mar. 28, 2011, http://www.adaptivecomputing.com/resources/docs/mwm/, 841 pages.

TeraGrid [About] downloaded from the internet on Mar. 28, 2011. www.teragrid.org/web/about/index, 1 page.

Windows Azure downloaded from the internet on Mar. 28, 2011. http://www.microsoft.com/windowsazure/windosazure/ 2 pages.

Office Action issued in U.S. Appl. No. 13/432,074 dated Jul. 8, 2013, 18 pages.

Office Action issued in U.S. Appl. No. 13/432,070 dated Feb. 6, 2014, 27 pages.

Office Action issued in U.S. Appl. No. 13/432,074 dated Apr. 2, 2014, 16 pages.

Office Action issued in U.S. Appl. No. 13/432,117 dated Oct. 3, 2014, 28 pages.

Office Action issued in U.S. Appl. No. 13/432,088 dated Oct. 8, 2014, 30 pages.

Office Action issued in U.S. Appl. No. 13/432,117 dated Jul. 29, 2015, 22 pages.

Notice of Allowance issued in U.S. Appl. No. 13/432,088 dated Aug. 26, 2015, 18 pages.

Notice of Allowance issued in U.S. Appl. No. 13/432,117 dated Aug. 26, 2016, 14 pages.

Notice of Allowance issued in U.S. Appl. No. 15/362,177, dated Aug. 28, 2018, 15 pages.

\* cited by examiner

| | Order Completion Range | Price | Example Use | Rate Increasing Techniques | Contract Calculation |
|---|---|---|---|---|---|
| High Priority (902) | Hours – Same day needs | Highest | Financial Analysis | Kill Low Priority and Best Effort Jobs, Access Dedicated Resources | Instant State of Network, Short Term Estimations, Sliding Price |
| Low Priority (904) | Days – Take advantage of day-cycle usage patterns | Middle | Shipping Calculations | Kill Best Effort Jobs | Instant State of Network, Short Term Estimations, Long Term Estimations, Sliding Price |
| Best Effort (906) | Depends on system availability | Lowest | Academic Research | None | Long Term Estimations, Sliding Price |

OPPORTUNISTIC JOB PROCESSING OF INPUT DATA DIVIDED INTO PARTITIONS AND DISTRIBUTED AMONGST TASK LEVEL MANAGERS VIA A PEER-TO-PEER MECHANISM SUPPLIED BY A CLUSTER CACHE

CROSS-REFERENCE TO RELATED APPLICATIONS

This application is a continuation of U.S. application Ser. No. 15/362,177, filed Nov. 28, 2016, which is a continuation of U.S. application Ser. No. 13/432,117, filed Mar. 28, 2012, which claims the benefit of U.S. Provisional Application No. 61/468,417 filed Mar. 28, 2011, the contents of each are incorporated by reference herein.

TECHNICAL FIELD

This document relates to processing jobs, which are to be performed on computers, in a distributed computer environment.

BACKGROUND

Computing resources are used by computer programs during execution. The resources include disk space, memory allocation, network bandwidth, and processor cycles. Modern computers are designed to enable multitasking—the sharing of a single resource among multiple processes.

Distributed computing is an architecture that pools computer resources across multiple computer machines to carry out a single or multiple related processes. Computer code may be specially designed to be split, or can be executed by other code that is designed to split the executing code, across multiple computer machines, a feature sometimes called parallelization.

SUMMARY

In one aspect, a system includes one or more processing devices. The system further includes one or more storage devices storing instructions that, when executed by the one or more processing devices cause the one or more processing devices to implement a global-level manager configured to access a work order from a client, the work order referencing at least one executable file and one or more input files. The global-level manager further configured to access work order parameters associated with the work order, the work order parameters defining a requirement of the processing of the work order and includes at least a deadline for completion of the work order. The global-level manager further configured to determine a service level agreement to meet the work order parameters, the service level agreement includes a price. The global-level manager further configured to receive an indication from the client that the service level agreement is accepted. The global-level manager further configured to partition the one or more input files into multiple shards, partition the work order into multiple jobs, each job being associated with one or more of the multiple shards and the executable file. The global-level manager further configured to distribute the jobs among a plurality of clusters to be processed using underutilized computing resources in the clusters. The global-level manager further configured to monitor the processing of the jobs to insure that the deadline for completion of the work order will be met. The global-level manager further configured to provide a work order output to the client. The instructions, when executed by the one or more processing devices cause the one or more processing devices to implement the plurality of clusters. Each cluster includes one or more task level managers configured to process a job distributed to the cluster using underutilized computing resources in the clusters and generate a job output based on the processing. The job outputs are combined to form the work order output.

Implementations can include any, all, or none of the following features. The global-level manager can be configured to determine a process throughput that is required to meet the deadline for completing the work order; determine that the processing of the jobs of the work order is proceeding at less than the process throughput; and in response to determining that the processing of the jobs is proceeding at less than the process throughput, halt one or more lower priority jobs such that computational resources associated with the low priority jobs become available for the processing of the jobs of the work order. The lower priority job may be a best effort job that does not have an associated process throughput. The lower priority job may be a low priority job that has an associated throughput monitored by the global-level manager. The global-level manager may be further configured to reassign a job to a computing device whose computing resources are dedicated to completion of jobs assigned by the global-level manager. The global-level manager may be further configured to collect network metrics that describe computation resources available in the system; and wherein the service level agreement is determined based on the network metrics. Price of the service level agreement may be determined based on the network metrics.

In one aspect, a method is performed by one or more processors. The method includes accessing, at a global-level manager, a work order from a client, the work order referencing at least one executable file and one or more input files. The method further includes accessing work order parameters associated with the work order, the work order parameters defining a requirement of the processing of the work order and includes at least a deadline for completion of the work order. The method further includes determining a service level agreement to meet the work order parameters. The service level agreement includes a price. The method further includes receiving an indication from the client that the service level agreement is accepted. The method further includes partitioning the one or more input files into multiple shards, partitioning the work order into multiple jobs, each job being associated with one or more of the multiple shards and the executable file. The method further includes distributing the jobs among a plurality of clusters to be processed using underutilized computing resources in the clusters. Each cluster includes one or more task level managers configured to process a job distributed to the cluster using underutilized computing resources in the clusters and generate a job output based on the processing. The job outputs are combined to form the work order output. The method further includes monitoring the processing of the jobs to insure that the deadline for completion of the work order will be met. The method further includes providing a work order output to the client.

In one aspect, a computer readable storage medium storing a computer program, the program includes instructions that, when executed by one or more processing devices, cause the one or more processing devices to perform operations includes accessing, at a global-level manager, a work order from a client, the work order referencing at least one executable file and one or more input files. The operations further include accessing work order parameters associated
} with the work order. The work order parameters define a requirement of the processing of the work order and include at least a deadline for completion of the work order. The operations further include determining a service level agreement to meet the work order parameters. The service level agreement includes a price. The operations further include receiving an indication from the client that the service level agreement is accepted. The operations further include partitioning the one or more input files into multiple shards, partition the work order into multiple jobs, each job being associated with one or more of the multiple shards and the executable file. The operations further include distributing the jobs among a plurality of clusters to be processed using underutilized computing resources in the clusters. Each cluster includes one or more task level managers configured to process a job distributed to the cluster using underutilized computing resources in the clusters and generate a job output based on the processing. The job outputs are combined to form the work order output. The operations further include monitoring the processing of the jobs to insure that the deadline for completion of the work order will be met. The operations further include providing a work order output to the client.

Various implementations of the subject matter described here may provide one or more of the following advantages. In one or more implementations, spare resources in a computer system may be monetized. In one or more implementations, a three tier structure may facilitate the efficient delegation of low priority jobs. Sorting input data by size can permit a minimization of bandwidth required to move the data. Also, with certain examples, server-side virtual clients can provide a secure and light-weight execution environment for untrusted code. In one or more implementations, calculating and tracking process throughput can enable a system to respond and increase process throughput.

The details of one or more implementations are set forth in the accompanying drawings and the description below. Other features and advantages will be apparent from the description and drawings, and from the claims.

DESCRIPTION OF DRAWINGS

FIG. 9 is a listing of example features available in service level agreements.

DETAILED DESCRIPTION

Very large distributed systems, made up of hundreds or thousands of computers, are often not utilized to full capacity. Spare resources in the form of idle cycles, memory, and network bandwidth may be available for the processing of very low priority jobs. In order to utilize those spare resources a computer system may accept very low priority jobs from paying customers and process those jobs using the spare resources.

Figure 1A:
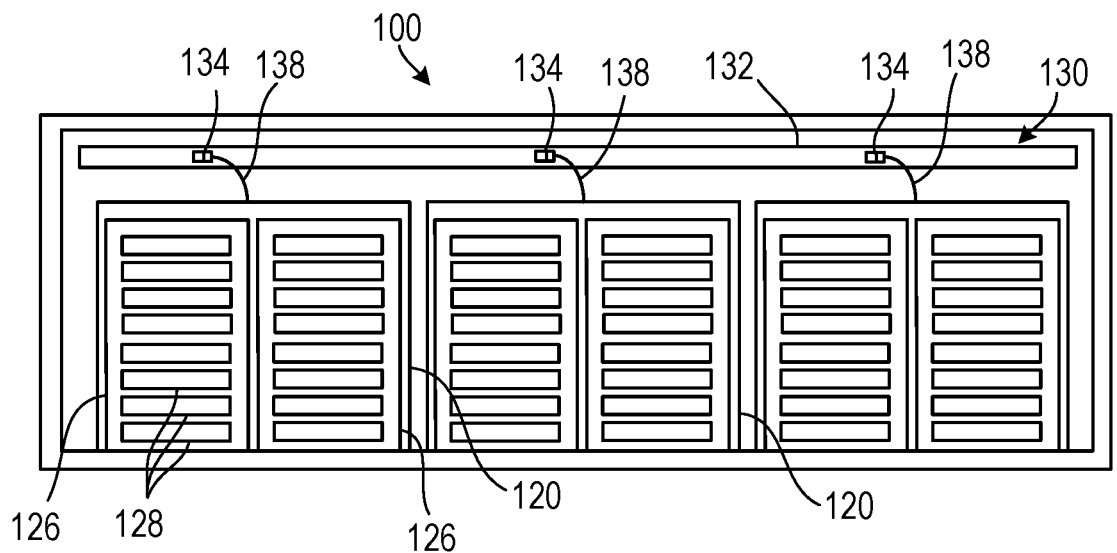
FIGS. 1A and 1B are side and plan views of an example of a facility that serves as a data center.
Figure 1B:
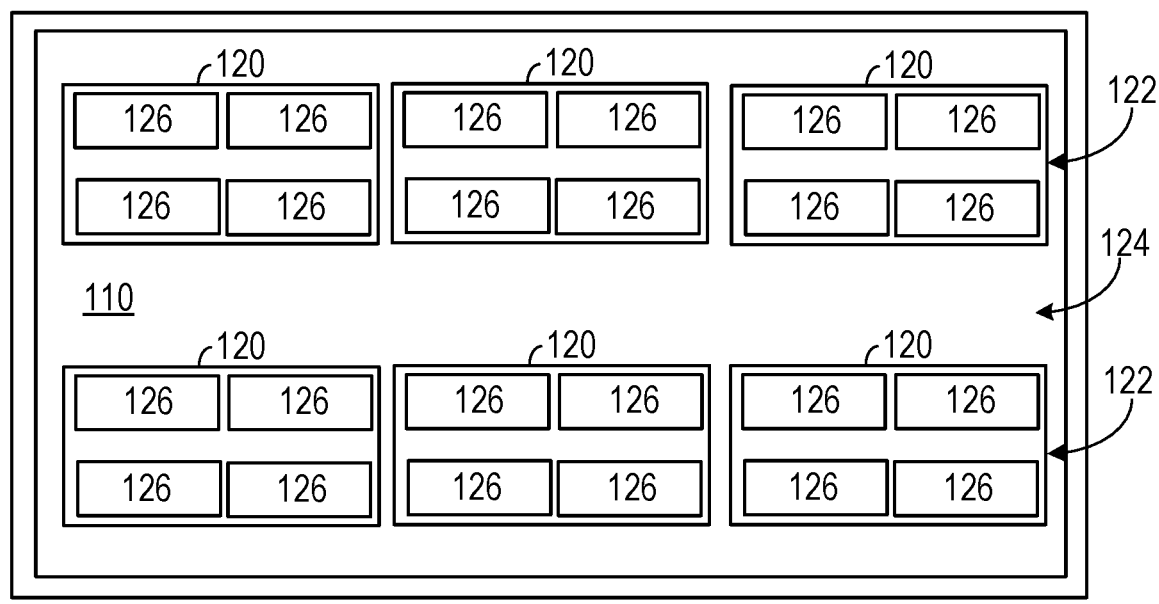

FIGS. 1A and 1B are side and plan views, respectively, to illustrate an example of a facility 100 that serves as a data center. The facility 100 includes an enclosed space 110 and can occupy essentially an entire building, such as a large and open warehouse or shed space, or be one or more rooms within a building. The enclosed space 110 is sufficiently large for installation of numerous (dozens or hundreds or thousands of) racks of computer equipment, and thus could house hundreds, thousands or tens of thousands of computers.

Modules, e.g., cages 120, of rack-mounted computers are arranged in the space in rows 122 that are separated by access aisles 124 in the form of worker walkways. Each cage 120 can include multiple racks 126, e.g., four to eight racks, and each rack includes multiple computers 128, e.g., trays.

The facility also includes a power grid 130, which, in this implementation, includes a plurality of power distribution "lines" 132 that run parallel to the rows 122. Each power distribution line 132 includes regularly spaced power taps 134, e.g., outlets or receptacles. The power distribution lines 132 may be bus bars suspended on or from a ceiling of the facility. Alternatively, bus bars could be replaced by groups of outlets that are independently wired back to a power supply, e.g., elongated plug strips or receptacles connected to the power supply by electrical whips. As shown, each cage 120 can be connected to an adjacent power tap 134, e.g., by power cabling 138.

A number of facilities may be owned by the same organization and may be geographically dispersed in different geographic areas across one or more states, countries, and/or continents. The facilities may be communicably linked through a data network such as the Internet, or via a private network such as a fiber network owned by a company that operates the facility. Each facility such as facility 100 may have a number of different features. For example, some facilities may have different hardware and software, operating costs, or usage profiles. In addition, each facility may exhibit a partial or total failure from time to time. The failures may be planned, such as when part of a facility is taken off-line for upgrades or maintenance. The failures may also be unplanned, such as when a facility loses electrical power or is subject to a natural disaster.

Figure 2:
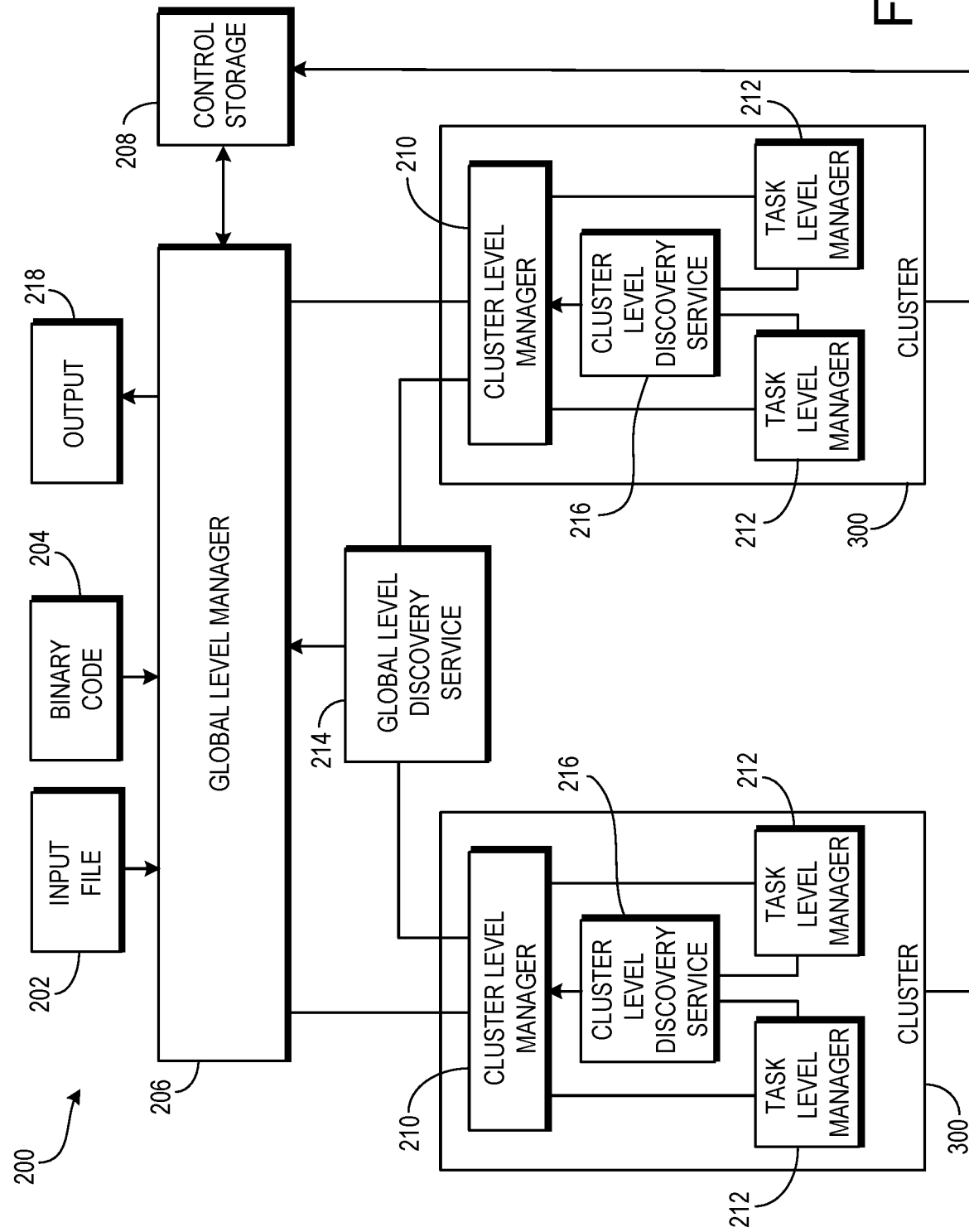
FIG. 2 is a block diagram of an example system for receiving and distributing job to be processed using idle computing resources.

FIG. 2 is a block diagram of an example system 200 for receiving and distributing jobs to be processed using idle computing resources. The system can be used to monetize underutilized central processing unit (CPU) cycles and other computational resources in a distributed computer hardware system. The jobs are in the form of defined computing tasks that may be assigned to particular computers or processes in the system 200, and that may provide useful output to a requester. The discussion here focuses on the interaction of various components at different levels in the system, in processing a job.

In a computer system made up of many facilities 100 that are designed and dedicated to carry out a range of tasks, some underutilization of resources is likely. Many task requirements ebb and flow—for example, the system 200 may have heavy usage during the day when most local users are awake and when businesses are open. Additionally, redundancies are often built into such a computer system to handle outages and downtime. When the daily usage patterns ebb and there are no outages or downtime, some of the resources in the system are likely to be underutilized. These underutilized resources can be tasked with low priority jobs provided by customers or clients.

Such low priority jobs can be held and then opportunistically processed in batches by the system 200. The system 200 can consider known or predicted factors of the facilities 100 when creating the batches. For example, batches may be scheduled initially to run during times of low utilization of the facilities 100. The batches can be organized so that data transfers, which often have an associated cost, are minimized. In some implementations, the size of each batch can also be based on the expected use patterns of higher priority jobs. The resources of the facilities 100 may be scheduled using bin packing algorithms that imperfectly utilize the resources of the facilities 100 in a predictable way (e.g., an expected number of unused CPU cycles per minute). In such a case, the system 200 can design the batches to use those expected unused resources (e.g., the expected number of unused CPU cycles per minute in a batch to be completed in one minute).

In the system 200, a client can submit a work order, which contains an input file 202 and binary code 204, to a global-level manger 206 for completion. The binary code 204 can be executable code written by or for the client that operates on the input file 202 to produce some output data that is of use or value to the client. Example binary code and input files can include, but are not limited to, financial analysis code and transaction data, primary research code and test data created by a university researcher, or bioinformatics application Basic Local Alignment Search tool (BLAST) code and bioinformatics data. In some implementations, any code that can be adequately parallelized and distributed may be appropriate for use as the binary code 204. The binary code 204 can be compiled with one or more frameworks or libraries that provide, for example, communication and distribution capabilities used for compatibility in the system 200. The input file 202 can be formatted according to one or more published data formats used by the system 200. One such data format may specify that the input file 202 be sharded or partitioned at a particular size.

The global-level manager 206 can receive the input file 202 and the binary code 204, and can create a job that specifies that the binary is to be run on the input file 202. The global-level manager 206 can also facilitate the storage of the input file 202 and binary code 204 in a central storage 208, either directly or by another system. The central storage 208 can serve the input file 202 and binary code 204 to other components of the system 200 as requested.

The central storage 208 can include storage facilities that are located at a number of geographically-dispersed facilities 100. The input file 202 and binary code 204 can be initially uploaded to a central storage facility that is geographically near the uploading client, and then can be replicated across a regional, national, or international domain.

The system 200 can use a multi-tiered, such as a three-tiered, model for job distribution and completion. A global-level manager 206, acting as the top tier, can distribute portions of the work order, called jobs, and shards of the input file 202—or references thereof—to cluster-level managers 210 in the second tier. The cluster-level managers 210 can register with a global-level discovery service 214 to post their availability to accept jobs. Each cluster-level manager 210 can further distribute the jobs to task-level managers 212. The task-level managers 212 can register with a cluster-level discovery service 216 that is associated with their cluster to post their availability to accept jobs. In some implementations, the cluster-level discovery service 216 and the global-level discovery service 214 are services that are shared by other systems that are running on the same clusters and networks. The cluster-level discovery service 216 and the global-level discovery service 214 can be configured as database tables in databases shared by many systems.

In some implementations, responsibilities are assigned to the lowest tier possible. For example, the cluster-level manger 210, not the global-level manager 206, can be responsible for distributing jobs to task-level managers 212. Information about the completion of jobs (e.g., job, opportunistic termination, assignments) can be transmitted up to the global-level manager for, for example, global coordination and reporting.

The task-level managers 212 can report completion of a job to the cluster-level manager 210, who can pass that report up to the global-level manager. Additionally, the task-level manager 212 can collect an output shard that has been created by the job, and can facilitate the storage of the output shard in the central storage 208, either directly or by another system. After receiving reports that all relevant jobs have been completed, the global-level manager 206 can collect all of the output shards in the central storage 208 associated with the job and create an output file 218

Figure 3:
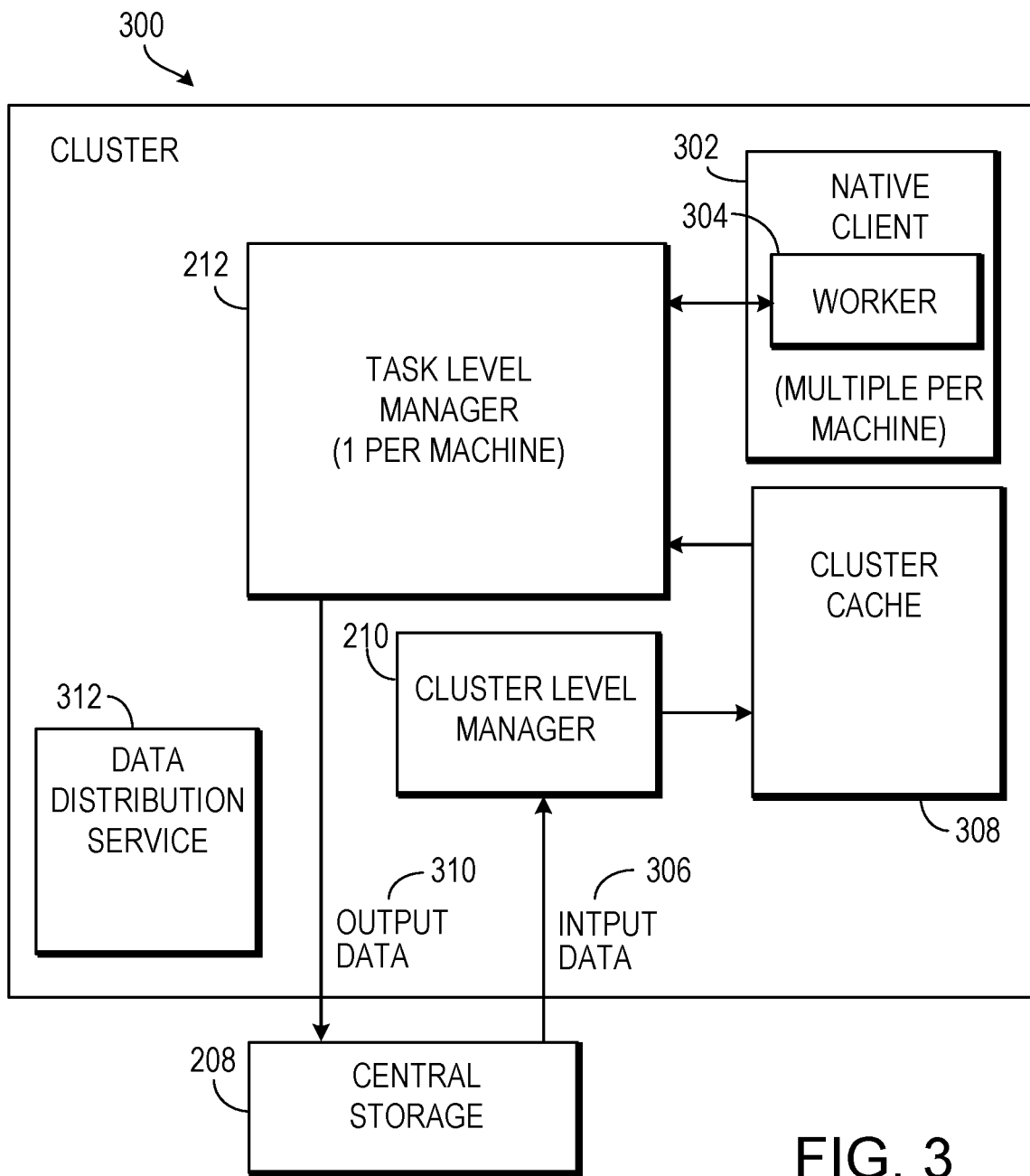
FIG. 3 is a block diagram of an example cluster for processing jobs using idle computing resources.

FIG. 3 is a block diagram of an example cluster 300 for processing jobs using idle computing resources. The cluster 300 is a group of computers or processes running on computers that can be treated together as a defined group, and may be on the order of hundreds or thousands of processors or processes. The cluster 300, in some implementations, can be defined in the facility 100 and can operate using spare computational resources in the facility 100. The cluster 300 can include one cluster-level manager 210 and one task-level manager 212 per computer 128. The cluster 300 may be used in a facility 100 that has homogeneous or heterogeneous hardware. For example, the computers 128 may have different arrangements of CPUs, available memory, etc, or the computers 128 may be collection of completely different computers sold by different vendors with different features.

The cluster-level manager 210 can be a long-running job that runs at production priority (i.e., a higher priority than the jobs to be distributed). The cluster-level manger 210 can receive jobs from the global-level manager 206 and assign those jobs to the individual task-level managers 212. The cluster-level manager 210 can share information with the global-level manager 206. For example, the cluster-level manager 210 can record the job that is assigned to each task-level manager 212 and can monitor the progress of the job.

The task-level manager 212 can be a job running at a lower priority than the cluster-level manager 210, but at a higher priority level than the jobs to be distributed. The task-level manager 212 can create and manage multiple native clients 302, each native client 302 hosting a worker 304 created from the binary code 204 to complete an assigned work assignment. The worker 304 processes the job, and reports the results to the task-level manager 212.

In some implementations, the jobs contain references to data needed to process the jobs, not the data itself. When the cluster-level manager 210 receives a job, or a group of jobs, the cluster-level manager 210 can retrieve the needed input data 306 from the central storage 208 and store the input data 306 in a cluster cache 308. The input data 306 can be a subset of the input file 202 that is needed to process the jobs that are received by the cluster-level manager 210. The cluster cache 308 can transfer the input data 306 to the task-level managers 212 as needed. For example, the cluster cache 308 can provide a protocol to facilitate peer-to-peer data transfer within cluster, with each task-level manager 212 and the cluster cache 308 acting as a peer. The task-level manager 212 can provide the needed input data 306 to each worker 304 so that the respective worker 304 can process a job. As such, the cluster 300 may be configured to only retrieve the input data 306 from the central storage 208 once and provide it to many task-level managers 212 without additional transfers from the central storage 208.

When a job is completed by the worker 304, the task-level manager 212 can receive output data 310 from the worker 304. The task-level manager 212 can provide the output data 310 to the central storage 208, and can notify the cluster-level manager 210 that the job has been completed. The cluster-level manager 210 can pass the notification to the global-level manager 206, optionally aggregating and/or summarizing multiple reports first.

A data distribution service 312 can facilitate cluster-to-cluster level data replication. For example, input data 306 in the cluster cache 308 of one cluster may be needed by another cluster 300. Instead of retrieving some or all of that input data 306 from the central storage 208, the data distribution service 312 of the cluster 300 may request the input data 306 from the other cluster 300.

In some implementations, the number of task-level managers 212 in a cluster 300 may be constant. For example, each and every computer 128, or a constant subset of the computers 128, may have one task-level manager 212. Alternatively, the number of task-level managers 212 in the cluster 300 can vary according to, for example, the load of jobs received by the cluster-level manager 210. In this case, the cluster-level manager 210 can launch and destroy task-level managers 212 (which run as software processes) as needed.

Some workers 304 in the same task-level manager 212 may be from the same customer or client, and may use some of the same input data 306. In these cases, the task-level manager 212 can be configured to share the shared input data 306 with the workers 304 from a common local cache. If the workers 304 are from different customers or clients, no such sharing may be permitted.

Figure 4:
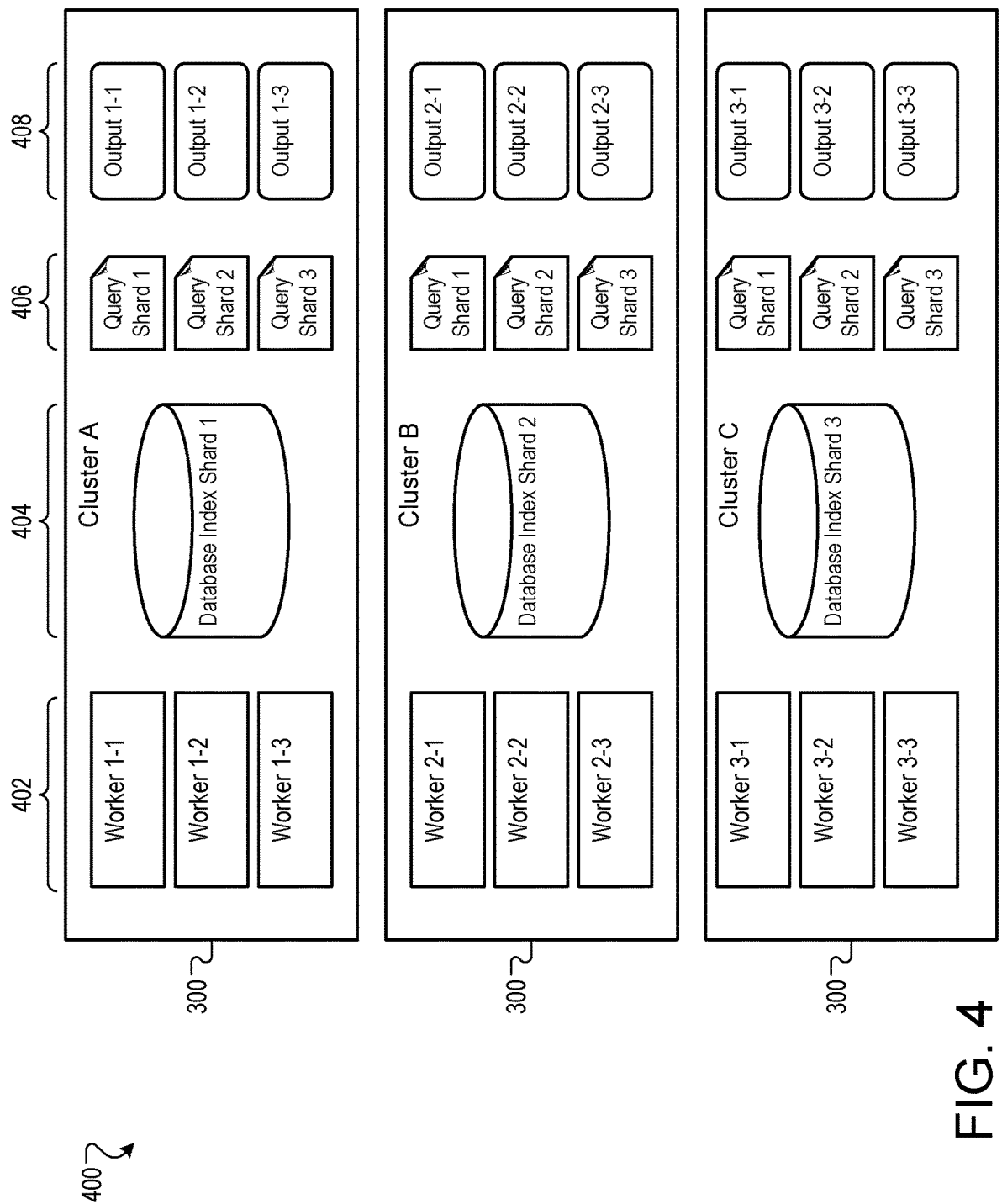
FIG. 4 is a schematic view of example data that is organized according to data sizes.

FIG. 4 is a schematic view of example data 400 that is organized according to data sizes. In some implementations, input data files 202 can include data of different types. Some of those data types may be larger than other types found in the same input data files 202, sometimes orders of magnitude larger. In such cases, the data 400 can be organized such that transfers of the larger data types from the central storage 208 to the clusters 300 are minimized or reduced.

For example, a client may submit a work order whose algorithm requires comparing N large data objects (e.g. database shards) to M small data objects (e.g. query shards). Such a work order requires N*M combinations and can be distributed between N*M workers. One such example work order is the bioinformatics application Basic Local Alignment Search Tool (BLAST).

In some implementations, input data 306 is larger than the binary code 204. Within the input data 306, database shards and binary large objects (BLOBs) are generally larger than structured data such as database queries. The input data 306 can be sorted by largest data type, then by each progressively smaller data type in the input data 306 to create input data groups. In the data 400, the input data 306 is sorted by database index shard 404, then by query shard 406.

The global-level manager 206 can assign to each cluster one database index shard 404 and each query shard 406. Additionally, the global-level manager 206 can assign workers 402 to each cluster 300 for each combination of input data 306 (that is, for every combination of data index shard 404 and query shard 406). The workers 402 can process their associated input (e.g. worker 1-3 402 can process database index shard 1 404 and query shard 3 406) to produce a corresponding output 408 (e.g. output 1-3 408).

Under the scheme shown here, the largest data objects, database index shards 404, are moved to a cluster only once. The database index shards 404 need not be replicated, in whole or in part, between different clusters. The scheme shown can be calculated and created proactively, before or as work assignments are distributed by the global-level manager 206, permitting network and cluster 300 level caching.

Figure 5:
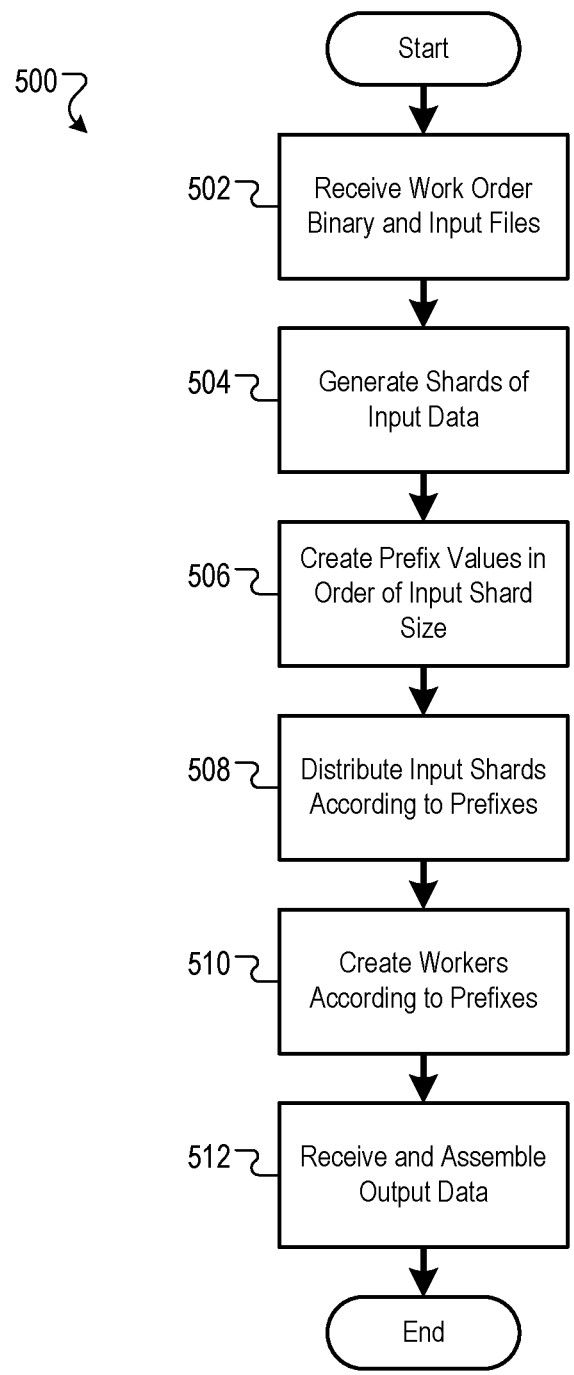
FIG. 5 is a flow chart of an example process for organizing data according to data sizes.

FIG. 5 is a flow chart of an example process 500 for organizing data according to data sizes. The process 500 can be performed by, for example, the global-level manager 206, and for clarity of presentation, the description that follows uses the system 200 as the basis of describing the process. However, another system, or combination of systems, may be used to perform the process 500.

An executable job and an input resource are received at a global-level manager (502). For example, a client can develop executable binary code 204 designed to operate on an input file 202. The global-level manager 206 can provide an web interface or application protocol interface (API) to receive the binary code 204 and the input file 202. The global-level manager 206 can store the input file 202 and the binary code 204 in the central storage 208, and create object references that point to the stored input file 202 and the binary code 204.

Input data shards are generated from the input resource (504). For example, a first type of input resource can be identified as being larger than a second type of input, and the first type and second type of input can each be split into a plurality of shards. The global-level manager 206, for example by manipulating the object references or issuing commands to the central storage 208, can split the input file 202 into two or more input data shards such as the database index shards 404 and the query shards 406. The input data shards can be, for example, limited by raw disk size or number of data elements.

Prefix values can be created in order of shard input size (506). For example, each of the first-type input shards can be associated with a copy of every second-type input shard. For each database index shard 404, the global-level manager 206 can create jobs specifying one database index shard 404 and each query shard 406.

The global-level manager can distribute each first-type input shard to a cluster from among a plurality of clusters, along with the associated second-type input shards and the executable file (508). Workers are created for each first-type input shard and second-type input shard combination, as appropriate, so that the first-type input shard and the second type-input shard are processed by the executable file using underutilized computing resources in the cluster (510). For example, the global-level manager 206 can distribute the jobs to the clusters 300. The clusters 300 can receive the jobs, and fetch the referenced database index shards 404 and query shards 406 from the central storage 208.

Output data can be assembled and received (512). For example, the clusters can distribute the jobs, database index shards 404 and query shards 406 to task-level managers 212 for processing. The task-level managers 212 can create workers 304 to process the database index shards 404 and query shards 406, and collect the resulting output data 310. The task-level workers can report task completion to the global-level manager 206 via the cluster-level managers 210 and store the output data 310 in the central storage 208. The global-level manager 206 can collect the output data 310 as it is stored or upon completion of the final job, and can prepare the output data 310 for transfer to the client as output file 218.

Figure 6:
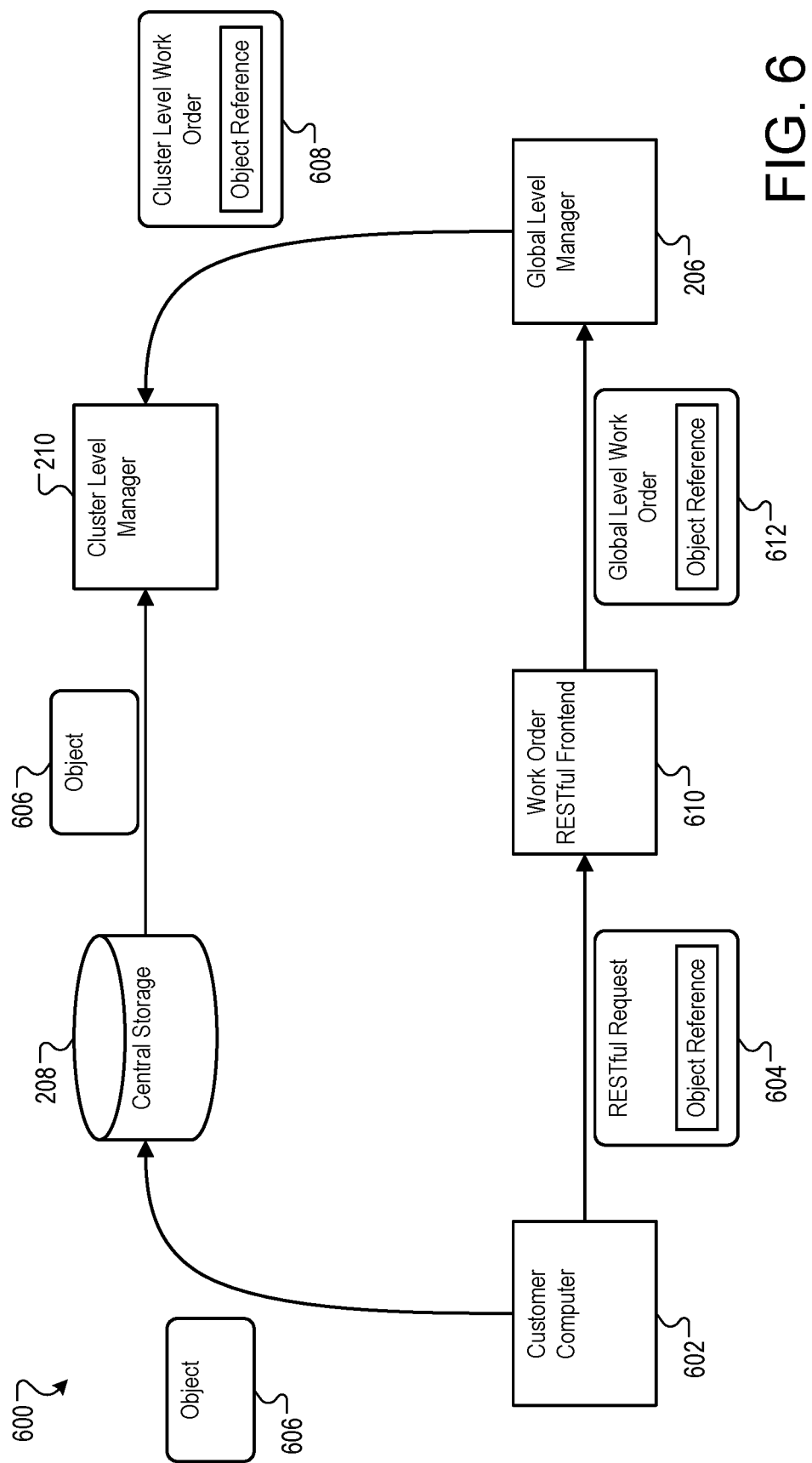
FIG. 6 is a block diagram of an example system for receiving work order submissions.

FIG. 6 is a block diagram of an example system 600 for receiving work order submissions. In the system 600, a customer computer 602 submits a work order via a representational state transfer (RESTful) API that permits construction of simple work order descriptions and decoupling of work order from associated data.

The customer computer 602 can communicate with a work order RESTful frontend 610, and submit a RESTful request 604. For example, the work order RESTful frontend 610 can serve to the customer computer 602 a webpage that can accept the input file 202 and the binary code 204 and generate the RESTful request 604. In another example, the work order RESTful frontend 610 may accept, from a client application on the customer computer 602, an API message specifying the RESTful request 604. In either case, the user of the customer computer 602 need not design or format the RESTful request 604 manually.

The RESTful request 604 can include one or more object references that reference an object 606. The object 606 may be any type of data object associated with the RESTful request 604, including the input file 202 and the binary code 204. The customer computer 602 can send the object 606 to the central storage 208, for example before submission of the RESTful request 604 to the work order RESTful frontend 610.

The work order RESTful frontend 610 can validate and convert the RESTful request 604 into a global-level work order 612 and transmit the global-level work order 612 to the global-level manager 206. The global-level work order 612 can, for example, contain the object reference from the RESTful request 604, but have removed identifying information that specifies the real identity or financial information of the user of the customer computer 602. Instead, the global-level work order 612 may contain, for example, unique, anonymized user identification information.

The global-level manager 206 can split the global-level work order 612 into one or more cluster-level jobs 608 for processing by the cluster-level managers 210. The cluster-level job 608 may also contain the object reference from the global-level job 612 and the RESTful request 604.

The cluster-level manager 210 can receive a cluster-level job 608 and identify the object 606 from the object reference as required for processing the global-level job 612. The cluster-level manager 210 can request and receive the object 606 from the central storage 208.

Figure 7:
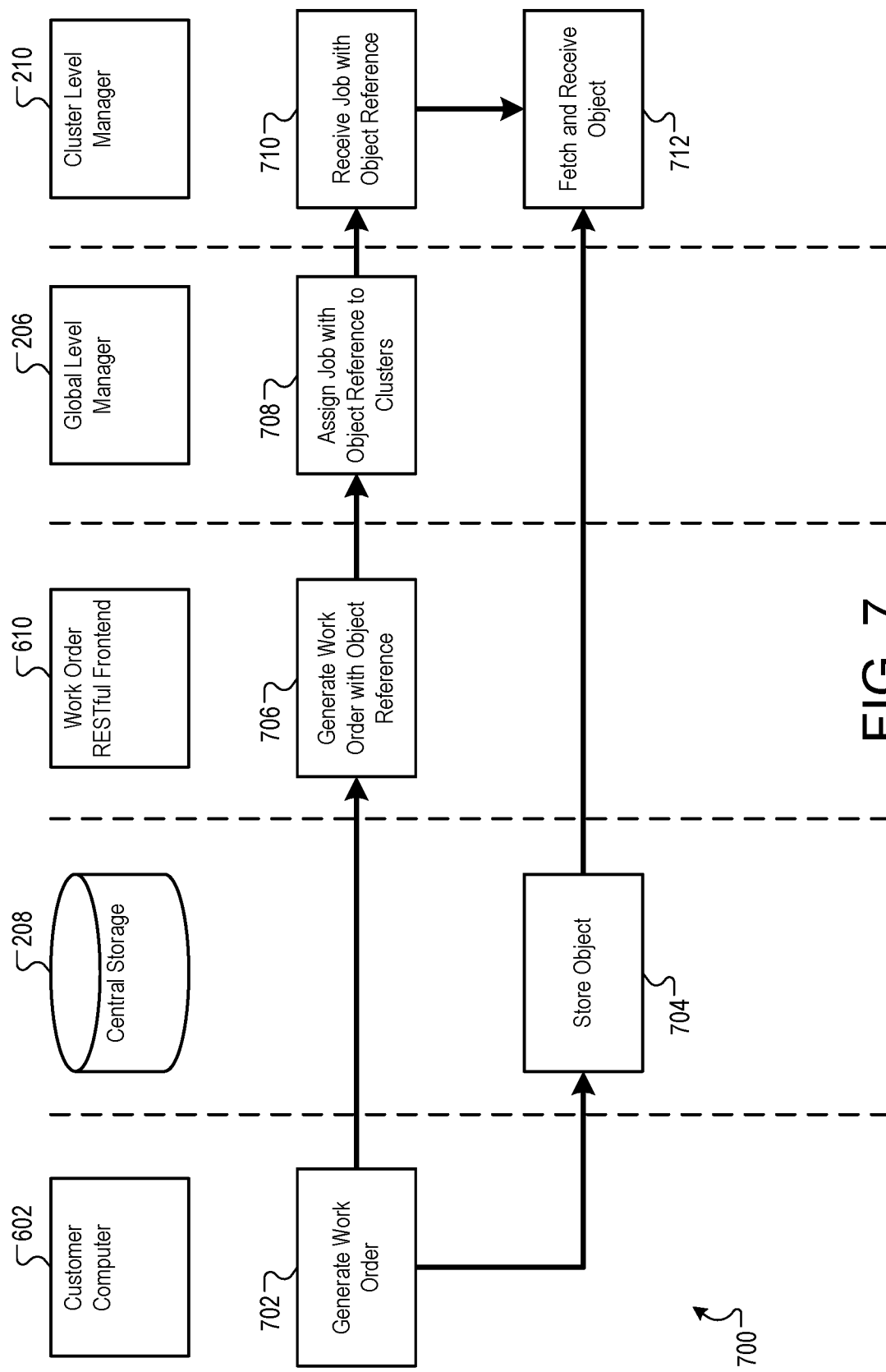
FIG. 7 is a swim lane diagram of an example process for receiving work order submissions.

FIG. 7 is a swim lane diagram of an example process 700 for receiving work order submissions. The process 700 can be performed by, for example, the system 600, and for clarity of presentation, the description that follows uses the system 600 as the basis of describing the process. However, another system, or combination of systems, may be used to perform the process 700.

The customer computer 602 can generate a work order (702). For example, the customer computer may collect or create the input file 202 and the binary code 204 and use them to generate a work order according to one or more specifications published by, for example, the work order RESTful frontend 610.

The central storage 208 can receive and store the data object (704). For example, the customer computer 602 can send the binary code 204 or the input file 202 to the central storage 208 as the object 606, or as more than one object. The central storage 208 can accept and store the object 606 and return to the customer computer 602 an object reference that describes the location of the object 606 in the central storage 208.

The work order RESTful frontend 610 can receive, from the client computer, a work order containing the reference to the data object (610). For example, upon completion of transfer of the object 606 to the central storage 208, the customer computer can send the RESTful request 604 to the work order RESTful frontend 610. The work order RESTful frontend 610 can verify the account of the user of the customer computer 602, transact any financial actions associated with the RESTful request, and generate the global-level work order 612 from the RESTful request 604.

The global-level manager 206 can partition the work order and assign the job to a plurality of clusters for processing (708). For example, after reception of the global-level work order 612, the global-level manager 206 can identify a group of clusters available to process portions of the global-level work order 612. The global-level manager 206 can partition the global-level work order 612 into cluster-level work order 608 orders that can specify which processes in the global-level work order 612 are to be performed by each cluster, and can include the object reference for input to the processes.

A cluster-level manager in each cluster can receive the job with the object reference (710) and can fetch the data object from the central storage system (712). For example, the cluster-level manager 210 can parse the cluster-level job 608 to identify the object reference and can request the object 606 from the central storage 208. When received, the cluster-level manager 210 can store the object 606 in the cluster's cluster cache 308 so that it is available to the cluster's task-level manager 212.

Figure 8A:
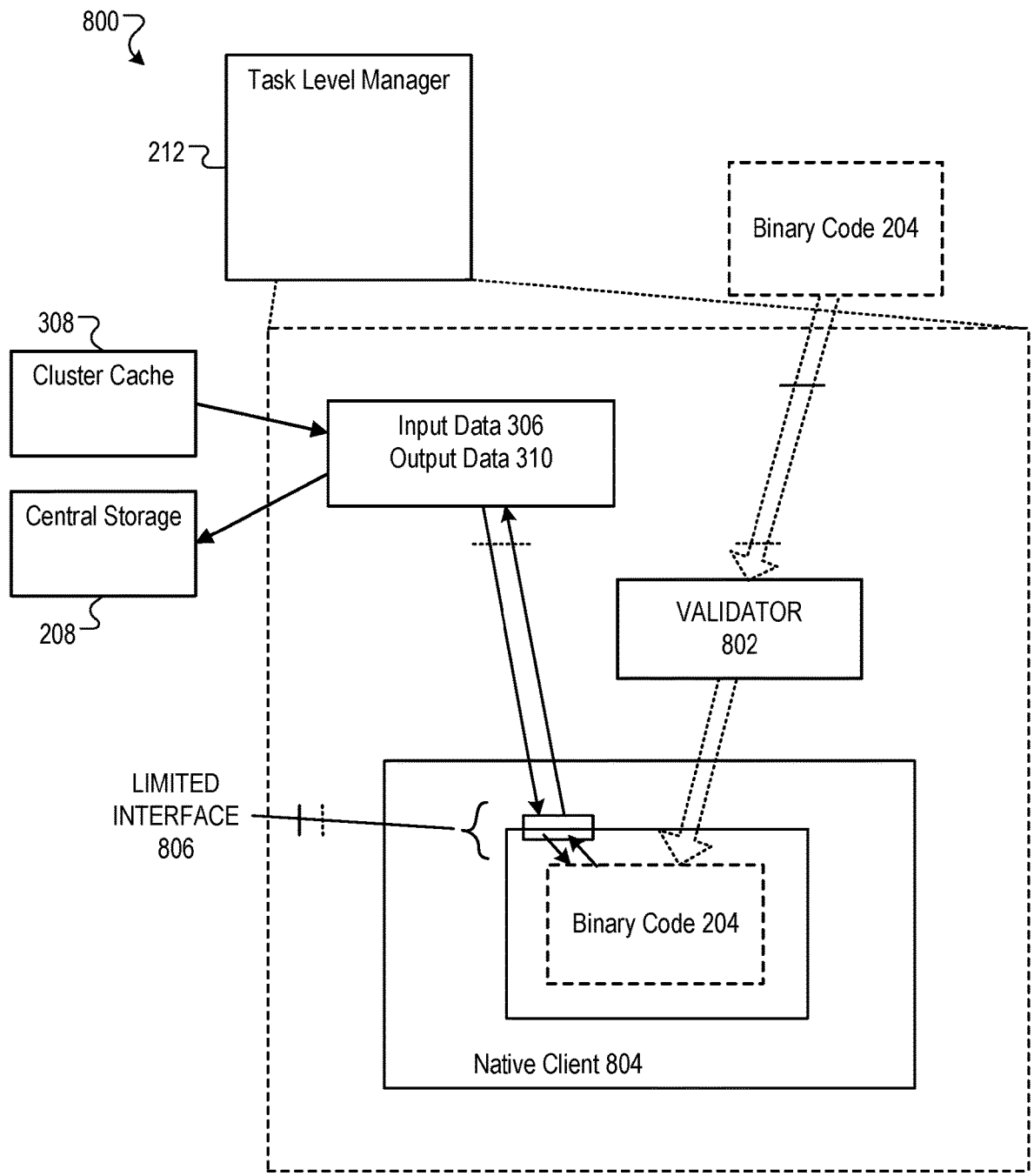
FIG. 8A is a block diagram of an example system to execute untrusted code modules.

FIG. 8A is a block diagram of an example system 800 to execute untrusted code modules, such as the binary code 204. The described techniques can be used to: execute and/or extend untrusted stand-alone applications in a cluster or server environment; allow user enhancement of specialized environments such as game consoles, where allowing users to extend application functionality in a protected (but high-performance) manner may be desirable; safely execute email attachments; and enhance scripting environments by safely using native code to speed up critical and/or compute-intensive code sections.

When the task-level manager 212 receives the binary code 204, it is validated by validator 212 as it is loaded into a native client 804. If validator 212 determines that the binary code 204 is not compliant with a set of validation rules, the binary code 204 is rejected (and hence not executed). Otherwise, if binary code 204 passes validation, it can be safely executed in the native client 804. During execution, native client 804 provides a very limited interface 806 between the binary code 204 and other software entities and hardware resources, moderating all external requests made by binary code 204 (as well as the way in which these requests are made).

In some implementations, the system allows safe execution of the binary code 204 in the form of an x86 binary code module in the cluster 300, thereby enabling the binary code 204 to serve as an application component that can achieve native performance but is structurally constrained from accessing many of the components of the cluster 300. Although the following description uses the Intel x86 processor architecture, the techniques described are not limited to this architecture, and can be applied to a wide range of processor and/or hardware architectures (e.g., the PowerPC and ARM architectures).

In certain embodiments, systems can provide the following benefits:

Protection: Untrusted modules cannot have unwanted side effects on a host process or any other part of the system, including other untrusted modules. Furthermore, untrusted modules cannot communicate directly with the network. The system prevents untrusted modules from making system calls, thereby preventing such untrusted modules from using such system calls to exploit system vulnerabilities by directly creating or modifying files in the file system, starting processes, engaging in clandestine network communications, etc. The untrusted module relies entirely on the secure runtime environment for access data services, with the secure runtime environment taking full responsibility for the safety of the services provided.

Privacy: The system ensures that untrusted modules cannot read or write data to which they have not been explicitly granted access.

Operating System Portability: The system allows untrusted modules to be executed on any operating system that supports the secure runtime environment (e.g., for the x86 architecture, untrusted modules could be supported in the WINDOWS, MACOS, and LINUX operating systems.

Multi-threading: Untrusted modules may be multi-threaded.

System Implementation and Performance: The system is optimized to need only a small trusted code base, thereby facilitating portability, security audits, and validation. The system provides performance for compute intensive modules that is comparable to unprotected native code Ease of Module Implementation: External developers can easily write and debug modules to be executed in the system using familiar tools and programming techniques.

Note that the described system may simultaneously address both performance and portability issues while eliminating security risks, thereby allowing developers to use portable, untrusted native-code modules in their applications without requiring application users to risk the security of their devices and/or data.

In some implementations, the system includes: a modified compilation chain that includes a modified compiler, assembler, and linker that are used to generate safe, compliant executable program binaries; a loader/validator 802 that loads the module into memory and confirms that the untrusted module is compliant with a set of code- and control-flow integrity requirements; and a runtime environment that provides data integrity and moderates both the module's ability to access resources and how the module accesses such resources. The compilation and validation processes ensure that unwanted side effects and communications are disabled for the untrusted module, while the secure runtime environment provides a moderated facility through which a limited set of desirable communications and resource accesses can safely occur. These components are described in more detail in the following sections.

In some implementations, complementary compilation and validation processes ensure that only safe native code modules are created and loaded into the system. The compilation process involves using a compiler, an assembler, and a linker which work together to generate a system-compliant binary native code module. The validator 802 loads this native code module into memory, and confirms that the native code module is indeed system compliant. Note that validating the compiled module at load time (as the last action prior to execution) allows the system to use (but not trust) the output of the compiler. Such validation can also detect any malicious actions that attempt to compromise the safety of the native code module between compilation and execution.

Note that the system can use a combination of compiler-based techniques and static binary analysis (e.g., analysis of assembly code during validation) to achieve safety with lower execution overhead than dynamically analyzing and rewriting executable code at runtime (as is commonly done in some virtual machine environments). Additionally, static binary analysis facilitates implementing the validator 802 and runtime environment in a small trusted code base, thereby facilitating security verification for the code base and reducing the likelihood of bugs and/or vulnerabilities. In some embodiments, however, the system may also use dynamic analysis and code-rewriting techniques.

In some implementations, creating a system compliant native code module involves following a set of restrictions and/or policies that preserve the integrity and security of code, control flow, and data. Preserving code integrity involves ensuring that only "safe" instructions can be executed by the native code module, and that no unsafe instructions can be inserted at runtime via dynamic code generation or self-modifying code. Restricting the instruction set which is available to the native code module also can help to make decoding the native code module (during validation) more reliable. Preserving control flow integrity involves ensuring that control flow instructions in the native code module cannot violate security by calling instructions outside of the native code module. Preserving data integrity involves ensuring that a native code module cannot perform "wild reads" or "wild writes" (e.g., reads or writes outside of a specified data region associated with the native code module).

In some implementations, the validator 802 helps to achieve code, control-flow, and data integrity for an x86 native code module in part by ensuring that a set of "unsafe" instructions from the x86 ISA (instruction set architecture) are not included in a native code module. For instance, the validator 802 may disallow the use of the following instructions and/or features in a native code module:

the syscall (system call) and int (interrupt) instructions, which attempt to directly invoke the operating system;
all instructions that modify x86 segment state (including LDS, far calls, etc), because these instructions interfere with the memory segments that are used to enforce data integrity (see the segmented memory description below);

the rdtsc (read time stamp counter) and rdmsr (read from model specific register) instructions, as well as other hardware performance instructions and/or features which may be used by a native code module to mount side channel attacks (e.g., by covertly leaking sensitive information);

various complex addressing modes that complicate the verification of control flow integrity;

the ret (return) instruction, which determines a return address from a stack location, and is replaced with a sequence of instructions that use a register specified destination instead (and hence is not vulnerable to a race condition that allows the stack location to be used as a destination by a first thread to be overwritten maliciously (or erroneously) by a second thread just prior to the execution of the return instruction); and some aspects of exception and signal functionality—for instance, while the system may support C++ exceptions (as defined in the C++ language specification), the system may not support hardware exceptions (such as divide-by-zero or invalid memory reference exceptions) due to operating system limitations, and may terminate execution of an untrusted native code module when faced with such a hardware exception.

Furthermore, to provide effective code discovery and control integrity, the system also restricts a set of control transfer instructions. Specifically, unmodified indirect control flow instructions that can transfer execution to arbitrary locations in memory need to be modified to guarantee that all indirect control flow targets are in memory regions that are valid for the native code module. Some implementations can limit indirect control flow instructions by: (1) not allowing return, far call, and far jump instructions, (2) ensuring that call and jump (imp) instructions only use relative addressing and are encoded in a sequence of instructions such that the control flow remains within the native code module; (3) ensuring that register indirect call and jump instructions are encoded in a sequence of instructions such that the control flow remains within the native code module and targets valid instruction addresses within the module; and (4) not allowing other indirect calls and jumps.

Figure 8B:
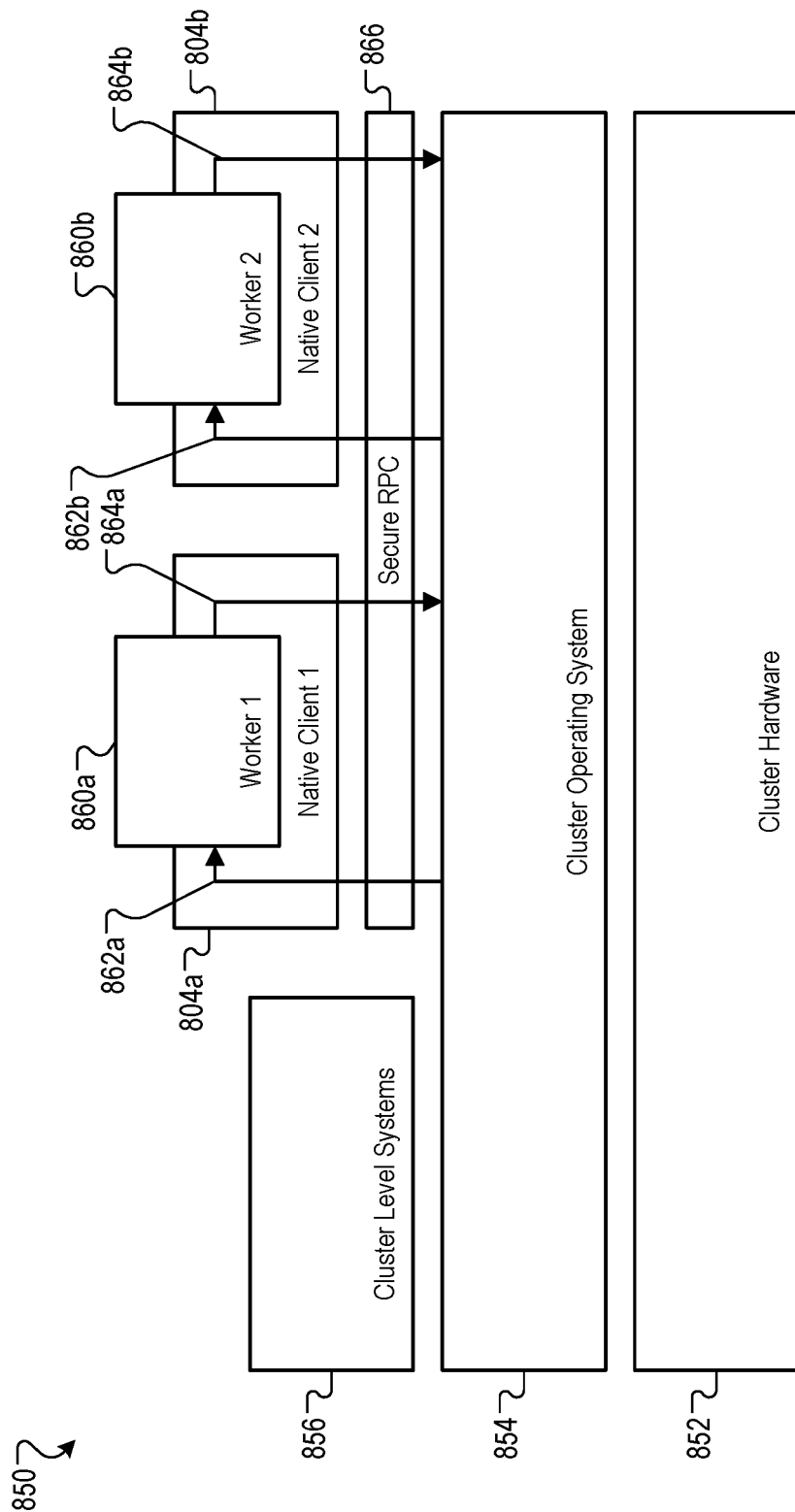
FIG. 8B is a block diagram of an example system for hosting workers in native clients.

FIG. 8B is a block diagram of an example system 850 for hosting workers in native clients. In some implementations, the system 850 can be used to ensure that each worker in the system 850 is able to execute separately with access limited to only appropriate input and output files.

Cluster hardware 852 includes any hardware, such as the facility 100 used to create the cluster 300. A cluster operating system 854 is the operating system and support systems that, among other tasks, facilitate communication between cluster-level entities 856. The cluster-level entities include the cluster-level manager 210, the task-level manager 212, the cluster cache 308, the data distribution service 312, and any other cluster entity that communicates relatively freely inside the cluster 300. It will be understood that communications between cluster-level systems 860 may be subject to a range of security restrictions, encryption, logging, etc.

The workers 860, by way of comparison, execute in native clients 804 and are subject to tight control on available input 862 and output 864. The native clients 804 are sandboxes created by the task-level managers 212, and provide execution space and limited communications functionality to the workers 860. The workers 860 are instances of executing processes created by the binary code 204 supplied by the customers of the system 200. In some implementations, the native clients 804 are light weight computational structures that require less resource overhead than, for example, virtual machines which also emulate processors, random access memory, and full network stacks.

The input 862 and output 864 channels available to the workers 860 can be limited to basic file operations and socket functionality to allow the workers 860 to access the input data 306 and to write the output data 310. In some implementations, the file access interface can be a subset of the UNIX file API, and the socket API can be the UNIX socket API. The subset of the UNIX file API can be limited to only the OPEN, READ, and WRITE functions.

To the workers 860, the input 862 and output 864 are presented as oriented communication channels—that is, input 862 is only for receiving data and output 864 is only for sending data—that permit the transmission of structured, serialized data. The structure required by the native clients 804 can be specified in one or more frameworks that are required for compiling the input binary 202.

Input 862 and output 864 between the cluster operating system 854—and thus any cluster-level system 856—and the native client pass through a secure remote procedure call (secure RPC) layer 866. The secure RPC layer 866 can perform policy checking and other security functions to ensure that the workers 860 only have access to read the input 306 and write the output 310. For example, any secure RPC read call specifying a memory value or name space not containing the input data 306 associated with the worker 1 860a can be denied.

The native clients 840, the secure RPC layer 866, and the cluster operating system 854 can all share the same file descriptors and namespace for the input data 306 and the output data 310. The native client 804 can provide the file descriptors to the worker 860 upon request. As such, the only source for valid file descriptors available to the worker 860 is the native client 804. In some implementations, the worker 860 can request many input or output file descriptors when it begins processing a job, append data to the end of the output files, and then close the files before terminating. The use of native clients for sandboxing as opposed to, for example, virtual machines, permits use of worker 860 that have been designed and programed using imperative algorithms. Once the file descriptors is provided to the worker 860, the worker 860 can actively request the file if and when it is needed, it does not need to wait to request the file.

In some examples, the worker 1 860a and the worker 2 860b may be created from binary code 204 from two different clients. In such a case, the worker 1 860a and the worker 2 860b are unable to access the same input data 306—each is restricted to only the input data 306 supplied by the same client for the same work order. In some other examples, the worker 1 860a and the worker 2 860b may be associated with the same client and the same work order. In this case, both the worker 1 860a and the worker 2 860b may be able to access at least some of the same input data 306.

In some implementations, the policy checking that the secure RPC layer 866 performs can be specified by or performed by a third party (or a software system provided by a third party). For example, a third-party regulatory or trusted computing authority may be entrusted with creating or adding to the functionality of the secure RPC layer 866 in order to provide extra assurance to customers or ensure compliance with legal requirements. Additionally or alternatively, the customer that supplied the binary code 204 used to create the worker 860 may add to or specify the behavior of the secure RPC layer 866.

In some implementations of the system 850, virtual machines may be used in place of the native clients 804.

Some of the features of the virtual machine may be disabled, for example to reduce computational requirements of the virtual machine and/or to prevent access by the workers 860.

FIG. 9 is a listing of example features 900 available in service level agreements (SLAs). An SLA can formally define the level of service that is to be provided, for example in a contract. In many cases, SLAs can specify a delivery deadline, steps used in order to meet the SLA, and metrics to be met in the service. The features 900 may be used in SLAs created for work order submitted to, for example, the system 200.

Three classes of SLAs may be used with the system 200 in the examples discussed here. A high priority class 902 SLA may have the most desirable features, a low priority class 904 SLA may have mid-tier features, and a best effort class 906 SLA may have the least desirable features and may be used in contracts with the lowest payments.

An order completion range feature can describe a general timeframe for completion of a submitted work order. In general, high priority class 902 SLAs may be completed in hours and may be appropriate for same day needs. For example, a banking institution may use a high priority class 902 SLA for work order to be completed in the same day. A low priority class 904 SLA may be completed in one or more days. The day-long time frame may allow the system 200 to take advantage of day-cycle usage patterns to schedule processing of jobs during the night time when usage and power costs are low. For example, a logistics firm may use a low priority SLA 904 for traffic simulation to determine congestion caused by proposed road repairs. A best effort class 906 SLA may be completed as so-called "best effort", that is, processed as system resources become available and are not is use with another, higher priority, work order. For example, a researcher or hobbyist may use a best effort 906 SLA for any project in which funding is limited but time to delivery is flexible.

A high priority class 902 SLA may have the most desirable features and may be used in contracts with the highest payments. A low priority class 904 SLA may have mid-tier features and may be used in contracts with mid-tier payments. A best effort class 904 SLA may have the least desirable features and may be used in contracts with the lowest payments.

The global-level manager 206 can monitor the resources available to the system 200 and adjust offered prices accordingly, either in real time or on a fixed or variable schedule. For example, the global-level manager 206 may increase or reduce price offers in real time for the high priority class 902 SLAs according to the current availability of computational resources and short term usage predictions (e.g. on the order of hours). For low priority class 904 SLAs, short term usage predictions (e.g. on the order of a day or a week) may also be factored to set the low priority class 904 SLA prices. For best effort class 906 SLAs, long term usage predictions may be used to determine best effort 906 SLA prices.

External and network factors may also be used to set price for SLAs. For example, electrical power in one facility 100 location may be cheaper than for the facility 100 closest to the client, or the farther facility 100 may be projected to have more idle cycles. The price of electricity and the price of bandwidth may both be incorporated in the price offered for all levels of SLA.

Different service levels can have different processes for meeting assurance levels. For example, high priority class 902 SLA jobs may be assigned a higher priority value in the system 200 and may kill lower priority jobs (e.g. from low priority class 904 and best effort class 906 SLAs) that are using resources that could be used for the high priority jobs. Additionally, the system 200 may include some dedicated computational resources to be used primarily or exclusively to fulfill high priority class 902 SLA jobs. It will be noted, however, that other processes that use the facilities 100 may have higher priority values than the high priority class 902 SLA jobs.

Low priority class 904 SLA job may be assigned a mid-priority value in the system 200 and may kill lower priority jobs (e.g. from best effort class 906 SLAs) that are using resources that could be used for the mid-priority jobs. The best effort class 906 SLA jobs, being best effort, may not have any rate increasing techniques.

Killed jobs—those killed by rate increasing techniques as well as those that die due to other factors such as hardware failure—can be monitored by the task-level managers 212. The task-level managers 212 can be configured to detect and report job death substantially immediately, as opposed to, for example, waiting until a job times out and assuming the job was killed. In the case of a detected job death, the task-level manager 212 restarts the job immediately or as soon as computational resources is available. Additionally or alternatively, the cluster-level manger 210 or the global-level manager 206 may determine a different task-level manager 212 or cluster 300 may be able to restart the killed job, and may reassign to the available resource.

As the jobs progress, the task-level manager 212 can monitor the job progress and report upward to the cluster-level manager 210, who in turn can report up to the global-level manager 206. These reports can be organized and summarized by the global-level manager for use by the system 200 or client that submitted the work order. One feature of the report is an indication of remaining balance in a customer's account for work order that are billed per cycle or per process. As the customer's balance reduces, the customer can be alerted, for example, to avoid a surprisingly large bill to the customer. This report can protect the customer against poorly designed, implemented, or configured code that requires more processing than the customer expected. This reporting can be done in real time, or on a routine (e.g. daily).

Another use of the reports is to enable monitoring of the rate of completion of jobs versus SLA described deadlines. If a job is being processed too slowly to meet the deadline, the global-level manager 206 can use one or more rate increasing techniques to increase the process throughput of the job in order to meet the deadline.

Figure 10:
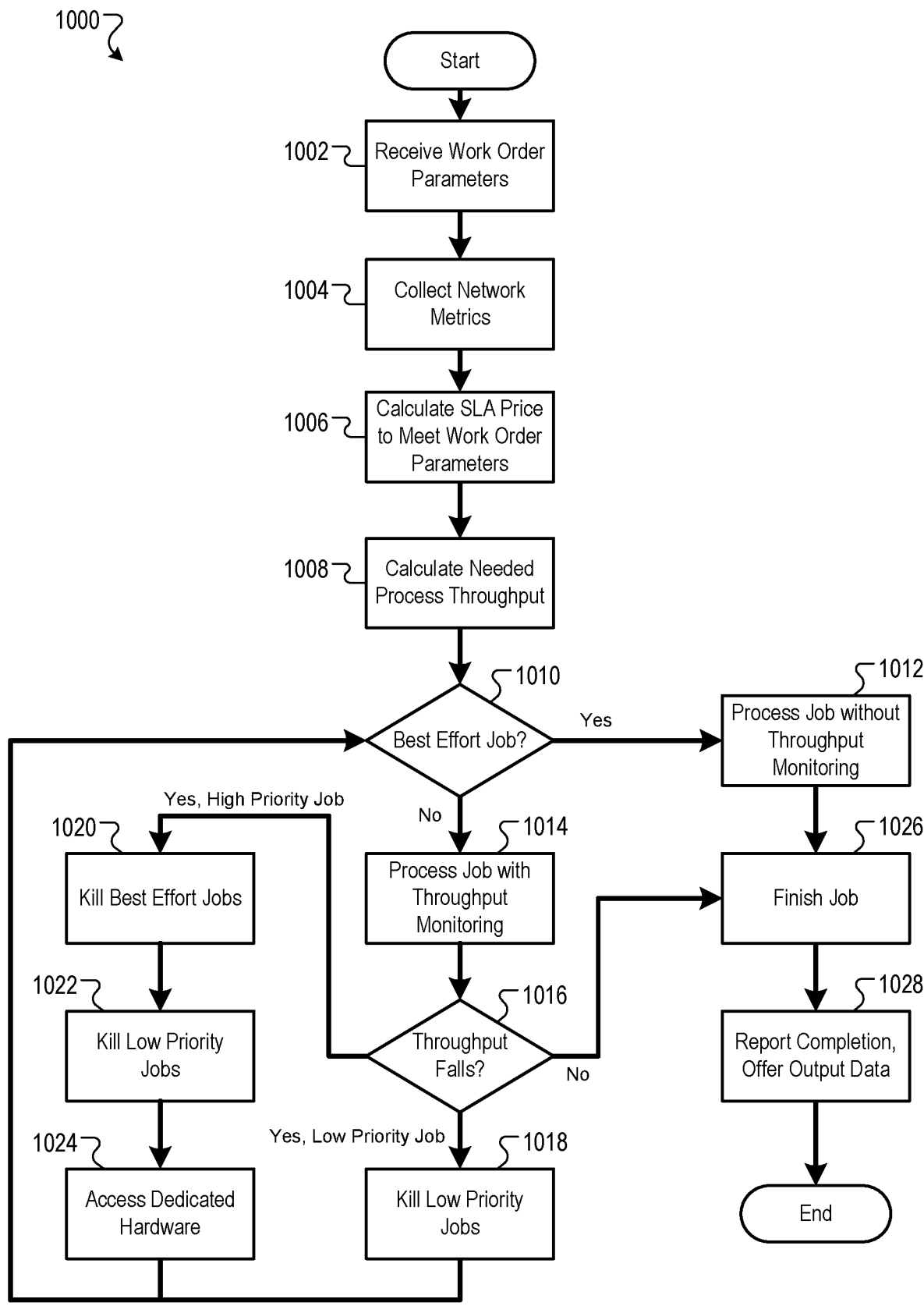
FIG. 10 is a flow chart of an example process for offering and fulfilling service level agreements.

FIG. 10 is a flow chart of an example process 1000 for offering and fulfilling service level agreements. The process 1000 can be performed by, for example, the system 200, and for clarity of presentation, the description that follows uses the system 200 as the basis of describing the process. However, another system, or combination of systems, may be used to perform the process 1000.

work order parameters associated with a work order request are received (1002). For example, a client may supply the information about the input file 202, binary code 204, price request, completion deadline, or other factors to the global-level manager 206. The global-level manager may catalog and categorize the supplied data into standard format to describe the work order request. Network metrics that describe computational resource availability are collected (1004). For example, the global-level manager may access or calculate resource availability and predictions that describe the current and future state of resources that may be used to process the work order.

A service level agreement is calculated to meet the work order parameters (1006). For example, the global-level manager 206 can calculate SLA features such as a deadline and class that meet the customer parameters given the current and projected state of computational resources. A service level price is calculated to meet the work order parameters (1006). For example, the global-level manager 206 can calculate, based in part on the scarcity of computational resources and the class of the SLA, a price to offer to the customer. In some implementations, the price can be presented to the customer with the option to change one or more work order parameters in order to generate a new price.

The needed process throughput is then calculated (1008). For example, the global-level manager can calculate a process throughput that defines the rate at which the customer's work order must be processed in order to meet the deadline. In some implementations, the process throughput may be a constant rate. For example, for a process with a deadline of twenty minutes, the process throughput may be calculated as one twentieth per minute. In some implementations, the process throughput may be variable. For example, for a low-priority class 904 SLA, the process throughput may vary based on time of day or week such that more processes are expected to be performed at night or on the weekend.

If the job is a best effort job (1010), the job is submitted for processing without throughput monitoring (1012). For example, the work order can be broken into jobs and distributed by the global-level manager 206 to the cluster-level managers 210 and then to the task-level mangers 212 for completion. Process throughput may not be monitored, but if a job is assigned to a task-level manger 212 without progress over a specified time period, the cluster-level manger 210 or the global-level manager 206 may reassign the job to a different task-level manger 212.

If the job is not a best effort job (1010), the job is submitted for processing with throughput monitoring (1014). For example, the work order can be broken into jobs and distributed by the global-level manager 206 to the cluster-level managers 210 and then to the task-level mangers 212 for completion. The global-level manager 206 can monitor the rate of job completion as reported by the cluster-level managers 210 based on information from the task-level managers 212.

If the process is proceeding at less than the calculated process throughput, and the job is a low priority job (1016), a lower priority job is halted (1018) so that computational resources associated with the lower priority job become available for processing the job. For example, task-level manager may kill a worker associated with a best effort class 906 SLA and generate a worker for the low priority job.

If the process is proceeding at less than the calculated process throughput, and the jobs is a low priority job (1020), a series of operations may be undertaken to increase the process throughput. For example, the task-level manager 212 may first kill best effort jobs (1020) and then low priority jobs (1022) to free up computational resources for the high priority job. If these actions do not free up enough computational resources, the cluster-level manager 210 or the global-level manager 206 may reassign the work order to dedicated computational resources that are only used or primarily used for ensuring the system 200 is able to meet high priority jobs.

Figure 11:
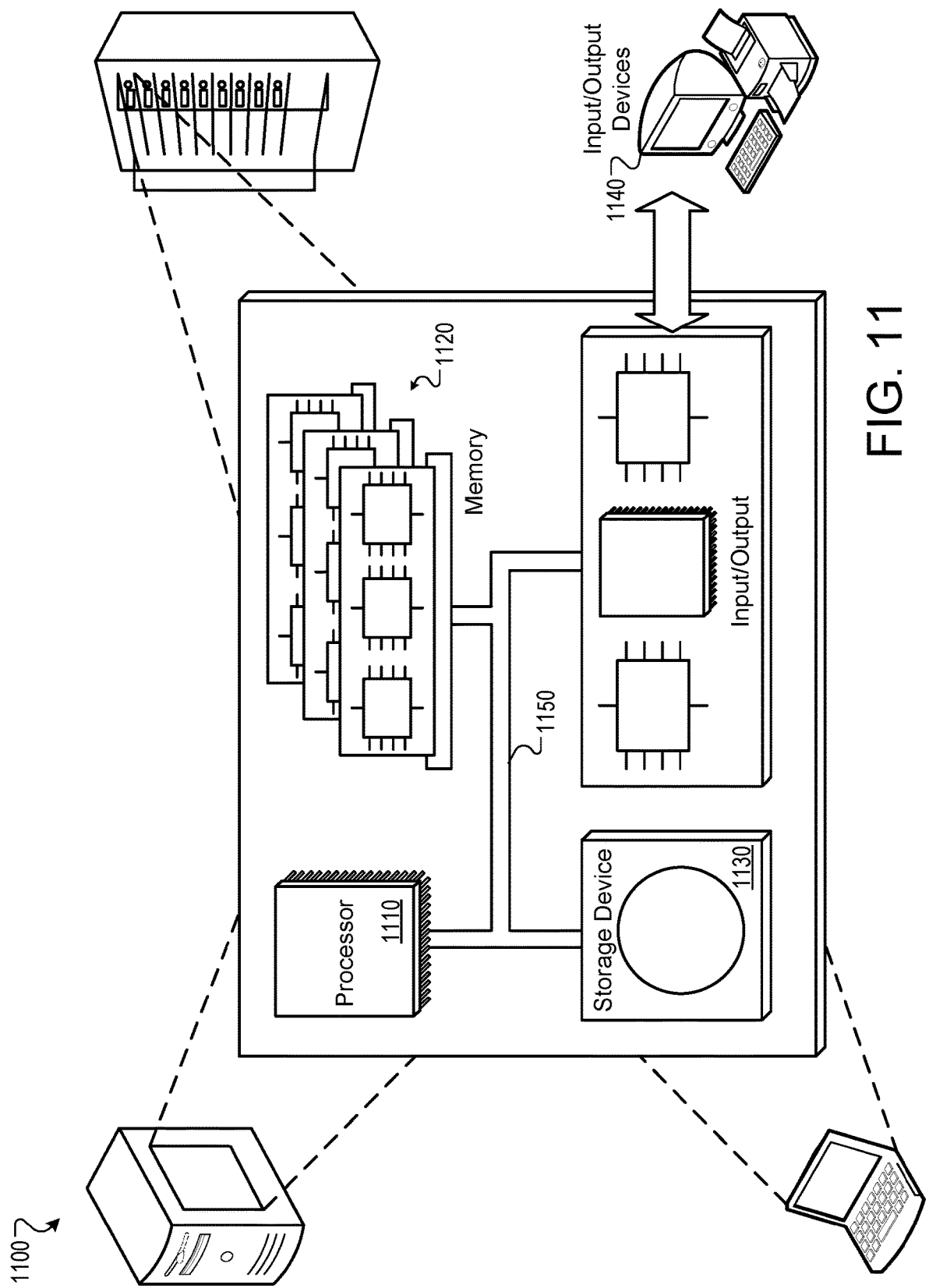
FIG. 11 is a schematic diagram that shows an example of a computing system that can be used in connection with computer-implemented methods and systems described in this document.

If the process proceeds at the calculated process throughput or greater (1016), the job completes by the deadline (1026). For example, the task-level managers 212 can submit output data 310 to the central storage 218. The completion is reported and output data is offered (1028). For example, an alert can be sent to the customer by the system 200 in the form of an email, text message, API message, or other format. The alert can include a link for downloading the output 218 or for storing the output 218 in another system FIG. 11 is a schematic diagram that shows an example of a computing system 1100. The computing system 1100 can be used for some or all of the operations described previously, according to some implementations. The computing system 1100 includes a processor 1110, a memory 1120, a storage device 1130, and an input/output device 1140. Each of the processor 1110, the memory 1120, the storage device 1130, and the input/output device 1140 are interconnected using a system bus 1150. The processor 1110 is capable of processing instructions for execution within the computing system 1100. In some implementations, the processor 1110 is a single-threaded processor. In some implementations, the processor 1110 is a multi-threaded processor. The processor 1110 is capable of processing instructions stored in the memory 1120 or on the storage device 1130 to display graphical information for a user interface on the input/output device 1140.

The memory 1120 stores information within the computing system 1100. In some implementations, the memory 1120 is a computer-readable medium. In some implementations, the memory 1120 is a volatile memory unit. In some implementations, the memory 1120 is a non-volatile memory unit.

The storage device 1130 is capable of providing mass storage for the computing system 1100. In some implementations, the storage device 1130 is a computer-readable medium. In various different implementations, the storage device 1130 may be a floppy disk device, a hard disk device, an optical disk device, or a tape device.

The input/output device 1140 provides input/output operations for the computing system 1100. In some implementations, the input/output device 1140 includes a keyboard and/or pointing device. In some implementations, the input/output device 1140 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method for using a multi-tiered model for job distribution and completion, the method comprising:
   receiving, by a cluster-level manager associated with a group of processes running on one or more processors that form a cluster, one or more input shards, wherein each of the one or more input shards (i) originate from a global-level manager and (ii) are generated based on processing, by the global-level manager, of a work order received by the global-level manager;
   storing, by the cluster-level manager, the one or more input shards in a cluster cache, the cluster cache supplying a peer-to-peer mechanism for transferring the one or more input shards between the cluster cache and a plurality of task-level managers;
   determining, by the cluster-level manager and based on a priority level associated with the one or more input shards, that the cluster-level manager is to delegate the one or more received input shards to a particular task-level manager of the plurality of task-level managers, including
      identifying the particular task-level manager of the plurality of task level-managers based on one or more respective attributes of the plurality of task level-managers;
   transferring, using the peer-to-peer mechanism from the cluster cache to the particular task-level manager identified by the cluster-level manager, the one or more received input shards;
   generating, based on processing of the one or more input shards by the particular task-level manager or a computing cluster managed by the particular task-level manager, one or more output shards;
   providing, by the particular task-level manager, the one or more output shards directly to a central storage; and
   collecting, by the global-level manager, the output shards from the central storage.

2. The method of claim 1, wherein the global level manager is configured to generate an output file in response to the work order based on the global level manager's assembling of received output shards from a plurality of cluster-level managers, wherein the received output shards from the plurality of cluster-level managers include the one or more received output shards from the cluster-level manager.

3. The method of claim 1, the method further comprising:
   receiving, by a cluster-level manager, one or more second input shards, wherein each of the one or more second input shards (i) originate from the global-level manager and (ii) are generated based on processing, by the global-level manager, of the work order or a different work order received by the global-level manager;
   determining, by the cluster-level manager and based on a priority level associated with the one or more second input shards, that the cluster-manager is to process the one or more second input shards without delegating execution of the one or more second input shards to a task-level manager;
   generating, by the cluster-level manager and based on processing of the one or more second input shards, one or more second output shards based on the cluster-level manager's processing of the one or more second input shards; and
   providing, by the cluster-level manager, the one or more second output shards to the global-level manager.

4. The method of claim 3, wherein the global level manager is configured to generate an output file in response to the work order based on the global-level manager's assembling of received output shards from a plurality of cluster-level managers, wherein the received output shards from the plurality of cluster-level managers include the one or more second output shards from the cluster-level manager.

5. The method of claim 3, wherein determining, by the cluster-level manager and based on a priority level associated with the one or more second input shards, that the cluster-manager is to process the one or more second input shards without delegating execution of the one or more second input shards to a task-level manager comprises:
   determining, by the cluster-level manager, that the one or more second input shards have been assigned a second level of priority that is higher than a threshold level of priority; and
       determining by the cluster-level manager, to process the one or more second input shards without delegating the one or more second input shards to the task-level manager.

6. The method of claim 1, wherein determining, by the cluster-level manager and based on a priority level associated with the one or more input shards, that the cluster-manager is to delegate the one or more received input shards to a task-level manager comprises:
   determining, by the cluster-level manager, that the one or more input shards have been assigned a first level of priority that is lower than a threshold level of priority; and
   delegating, by the cluster-level manager, the one or more input shards for processing by the task-level manager.

7. The method of claim 1, wherein determining comprises determining, by the cluster-level manager and based on a priority level associated with the one or more input shards and completion deadline included in the work order.

8. The method of claim 1, comprising adjusting processing throughput to meet a completion deadline.

9. A system comprising:
   one or more computers and one or more storage devices storing instructions that are operable, when executed by one or more computers, to cause the one or more computers to perform the operations comprising:
   receiving, by a cluster-level manager associated with a group of processes running on one or more processors that form a cluster, one or more input shards, wherein each of the one or more input shards (i) originate from a global-level manager and (ii) are generated based on processing, by the global-level manager, of a work order received by the global-level manager;
   storing, by the cluster-level manager, the one or more input shards in a cluster cache, the cluster cache supplying a peer-to-peer mechanism for transferring the one or more input shards between the cluster cache and a plurality of task-level managers;
   determining, by the cluster-level manager and based on a priority level associated with the one or more input shards, that the cluster-level manager is to delegate the one or more received input shards to a particular task-level manager of the plurality of task-level managers including
       identifying the particular task-level manager of the plurality of task level-managers based on one or more respective attributes of the plurality of task level-managers;
   transferring, using the peer-to-peer mechanism from the cluster cache to the particular task-level manager identified by the cluster-level manager, the one or more received input shards;
   generating, based on processing of the one or more input shards by the particular task-level manager or a computing cluster managed by the particular task-level manager, one or more output shards;
   providing, by the particular task-level manager, the one or more output shards directly to a central storage; and
   collecting, by the global-level manager, the output shards from the central storage.

10. The system of claim 9, wherein the global level manager is configured to generate an output file in response to the work order based on the global level manager's assembling of received output shards from a plurality of cluster-level managers, wherein the received output shards from the plurality of cluster-level managers include the one or more received output shards from the cluster-level manager.

11. The system of claim 9, the operations further comprising:
   receiving, by a cluster-level manager, one or more second input shards, wherein each of the one or more second input shards (i) originate from the global-level manager and (ii) are generated based on processing, by the global-level manager, of the work order or a different work order received by the global-level manager;
   determining, by the cluster-level manager and based on a priority level associated with the one or more second input shards, that the cluster-manager is to process the one or more second input shards without delegating execution of the one or more second input shards to a task-level manager;
   generating, by the cluster-level manager and based on processing of the one or more second input shards, one or more second output shards based on the cluster-level manager's processing of the one or more second input shards; and
   providing, by the cluster-level manager, the one or more second output shards to the global-level manager.

12. The system of claim 11, wherein the global level manager is configured to generate an output file in response to the work order based on the global-level manager's assembling of received output shards from a plurality of cluster-level managers, wherein the received output shards from the plurality of cluster-level managers include the one or more second output shards from the cluster-level manager.

13. The system of claim 11, wherein determining, by the cluster-level manager and based on a priority level associated with the one or more second input shards, that the cluster-manager is to process the one or more second input shards without delegating execution of the one or more second input shards to a task-level manager comprises:
   determining, by the cluster-level manager, that the one or more second input shards have been assigned a second level of priority that is higher than a threshold level of priority; and
       determining by the cluster-level manager, to process the one or more second input shards without delegating the one or more second input shards to the task-level manager.

14. The system of claim 9, wherein determining, by the cluster-level manager and based on a priority level associated with the one or more input shards, that the cluster-manager is to delegate the one or more received input shards to a task-level manager comprises:
   determining, by the cluster-level manager, that the one or more input shards have been assigned a first level of priority that is lower than a threshold level of priority; and delegating, by the cluster-level manager, the one or more input shards for processing by the task-level manager.

15. A non-transitory computer-readable storage device having stored thereon instructions, which, when executed by data processing apparatus, cause the data processing apparatus to perform operations comprising:
receiving, by a cluster-level manager associated with a group of processes running on one or more processors that form a cluster, one or more input shards, wherein each of the one or more input shards (i) originate from a global-level manager and (ii) are generated based on processing, by the global-level manager, of a work order received by the global-level manager;
storing, by the cluster-level manager, the one or more input shards in a cluster cache, the cluster cache supplying a peer-to-peer mechanism for transferring the one or more input shards between the cluster cache and a plurality of task-level managers;
determining, by the cluster-level manager and based on a priority level associated with the one or more input shards, that the duster-level manager is to delegate the one or more received input shards to a particular task-level manager of the plurality of task-level managers, including
identifying the particular task-level manager of the plurality of task level-managers based on one or more respective attributes of the plurality of task level-managers;
transferring, using the peer-peer mechanism, by the cluster cache to the particular task-level manager identified by the cluster-level manager, the one or more received input shards;
generating, based on processing of the one or more input shards by the particular task-level manager or a computing cluster managed by the particular task-level manager, one or more output shards;
providing, by the particular task-level manager, the one or more output shards directly to a central storage; and
collecting, by the global-level manager, the output shards from the central storage.

16. The non-transitory computer-readable storage device of claim 15, wherein the global level manager is configured to generate an output file in response to the work order based on the global level manager's assembling of received output shards from a plurality of cluster-level managers, wherein the received output shards from the plurality of cluster-level managers include the one or more received output shards from the cluster-level manager.

17. The non-transitory computer-readable storage device of claim 15, the operations further comprising:
receiving, by a cluster-level manager, one or more second input shards, wherein each of the one or more second input shards (i) originate from the global-level manager and (ii) are generated based on processing, by the global-level manager, of the work order or a different work order received by the global-level manager;
determining, by the cluster-level manager and based on a priority level associated with the one or more second input shards, that the cluster-manager is to process the one or more second input shards without delegating execution of the one or more second input shards to a task-level manager;
generating, by the cluster-level manager and based on processing of the one or more second input shards, one or more second output shards based on the cluster-level manager's processing of the one or more second input shards; and
providing, by the cluster-level manager, the one or more second output shards to the global-level manager.

18. The non-transitory computer-readable storage device of claim 17, wherein the global level manager is configured to generate an output file in response to the work order based on the global-level manager's assembling of received output shards from a plurality of cluster-level managers, wherein the received output shards from the plurality of cluster-level managers include the one or more second output shards from the cluster-level manager.

19. The non-transitory computer-readable storage device of claim 17, wherein determining, by the cluster-level manager and based on a priority level associated with the one or more second input shards, that the cluster-manager is to process the one or more second input shards without delegating execution of the one or more second input shards to a task-level manager comprises:
determining, by the cluster-level manager, that the one or more second input shards have been assigned a second level of priority that is higher than a threshold level of priority; and
determining by the cluster-level manager, to process the one or more second input shards without delegating the one or more second input shards to the task-level manager.

20. The non-transitory computer-readable storage device of claim 15, wherein determining, by the cluster-level manager and based on a priority level associated with the one or more input shards, that the cluster-manager is to delegate the one or more received input shards to a task-level manager comprises:
determining, by the cluster-level manager, that the one or more input shards have been assigned a first level of priority that is lower than a threshold level of priority; and
delegating, by the cluster-level manager, the one or more input shards for processing by the task-level manager.

* * * * *